(12) United States Patent
Mirkhaef et al.

(10) Patent No.: US 10,682,765 B2
(45) Date of Patent: Jun. 16, 2020

(54) SYSTEM AND METHOD FOR ROBOT TO PREPARE A FOOD PRODUCT

(71) Applicant: Prince Castle LLC, Carol Stream, IL (US)

(72) Inventors: David Mirkhaef, Willowbrook, IL (US); William James Fienup, Chicago, IL (US)

(73) Assignee: Prince Castle LLC, Carol Stream, IL (US)

(*) Notice: Subject to any disclaimer, the term of this patent is extended or adjusted under 35 U.S.C. 154(b) by 0 days.

(21) Appl. No.: 16/417,123

(22) Filed: May 20, 2019

(65) Prior Publication Data

US 2019/0351561 A1  Nov. 21, 2019

Related U.S. Application Data

(60) Provisional application No. 62/674,427, filed on May 21, 2018.

(51) Int. Cl.
| | |
|---|---|
| *B25J 15/04* | (2006.01) |
| *B25J 11/00* | (2006.01) |
| *B25J 19/00* | (2006.01) |
| *A47J 37/12* | (2006.01) |
| *B65B 11/02* | (2006.01) |
| *B65B 11/00* | (2006.01) |
| *B65B 49/00* | (2006.01) |
| *B65B 25/00* | (2006.01) |
| *A23P 20/20* | (2016.01) |

(52) U.S. Cl.
CPC ....... *B25J 11/0045* (2013.01); *A47J 37/1228* (2013.01); *B25J 15/0433* (2013.01); *B25J 19/00* (2013.01); *B65B 11/004* (2013.01); *B65B 11/02* (2013.01); *B65B 25/001* (2013.01); *B65B 49/00* (2013.01); *A23P 20/20* (2016.08)

(58) Field of Classification Search
CPC .... B25J 15/04; B25J 15/0408; B25J 15/0433; B25J 11/0045; B25J 19/00; A47J 37/1228; Y10S 901/50; Y10T 16/4707
USPC ................. 294/27.1, 145, 159, 170; 220/759
See application file for complete search history.

(56) References Cited

U.S. PATENT DOCUMENTS 446,114 A * 2/1891 Ericson
2,965,405 A * 12/1960 Herrick ................... A47J 45/10
294/27.1

(Continued)

FOREIGN PATENT DOCUMENTS

| DE | 201 06 942 U1 | 7/2001 |
|---|---|---|
| EP | 0 008 838 A2 | 3/1980 |

(Continued)

OTHER PUBLICATIONS

Nov. 20, 2019—(WO) ISR & WO—App. No. PCT/US2019/033155.

*Primary Examiner* — Dean J Kramer
(74) *Attorney, Agent, or Firm* — Banner & Witcoff, Ltd.

(57) ABSTRACT

A system and method utilizing a robotic arm to prepare a food product such as a meat for cooking and then subsequently assembling a sandwich from the cooked meat is disclosed. In addition, the robotic arm may also be used to wrap the assembled sandwich in a wrapper. The system may utilize a wire basket with a basket adapter, or handle, to allow the robotic arm to easily maneuver the basket and also utilize a wrapping assist device to wrap a wrapper around the assembled sandwich.

21 Claims, 42 Drawing Sheets

(56) References Cited

U.S. PATENT DOCUMENTS

| | | | | |
|---|---|---|---|---|
| 3,707,015 A | * | 12/1972 | Maynard | A47J 36/20 220/759 |
| 4,545,723 A | * | 10/1985 | Clark | B25J 15/04 294/86.4 |
| 4,841,596 A | * | 6/1989 | Fink | A45F 5/1026 16/411 |
| 5,029,922 A | * | 7/1991 | DiNapoli | A45F 5/10 294/27.1 |
| 5,181,757 A | * | 1/1993 | Montoya | A45F 5/1026 294/159 |
| 2012/0192724 A1 | | 8/2012 | Harrison et al. | |

FOREIGN PATENT DOCUMENTS

| | | |
|---|---|---|
| ES | 1 032 927 U | 7/1996 |
| GB | 2 435 252 A | 8/2007 |
| JP | H09-327392 A | 12/1997 |
| JP | 2004/209008 A | 7/2004 |
| JP | 4763850 B1 | 8/2011 |
| KR | 2010 0118050 A | 11/2010 |

* cited by examiner

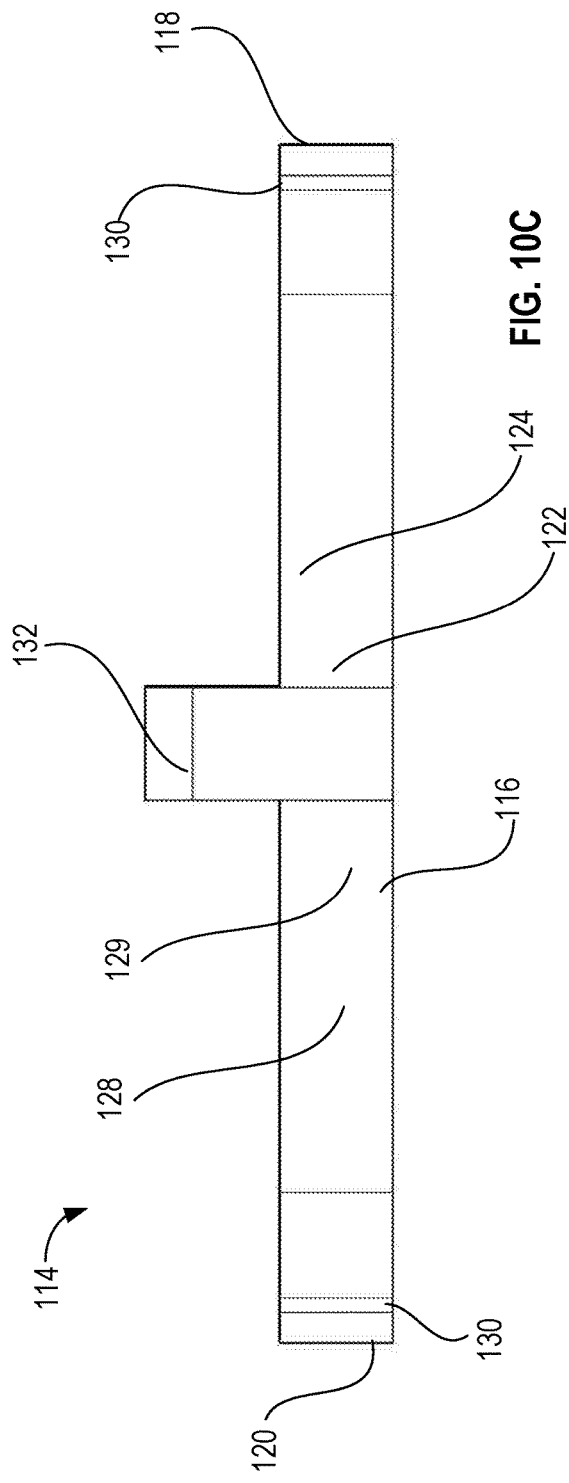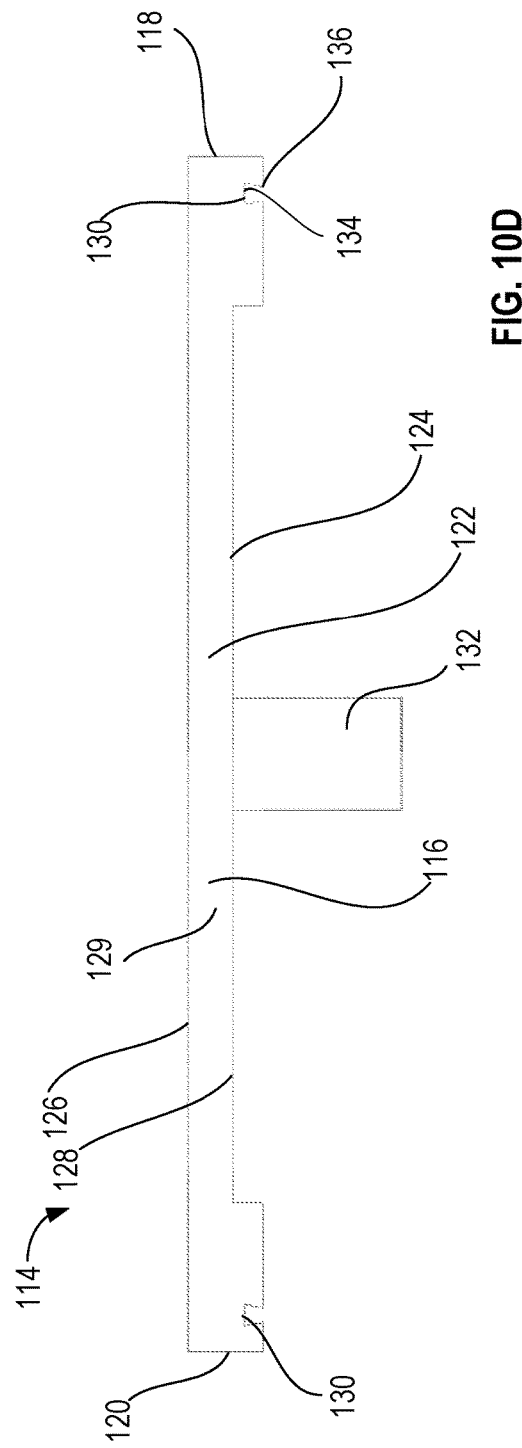

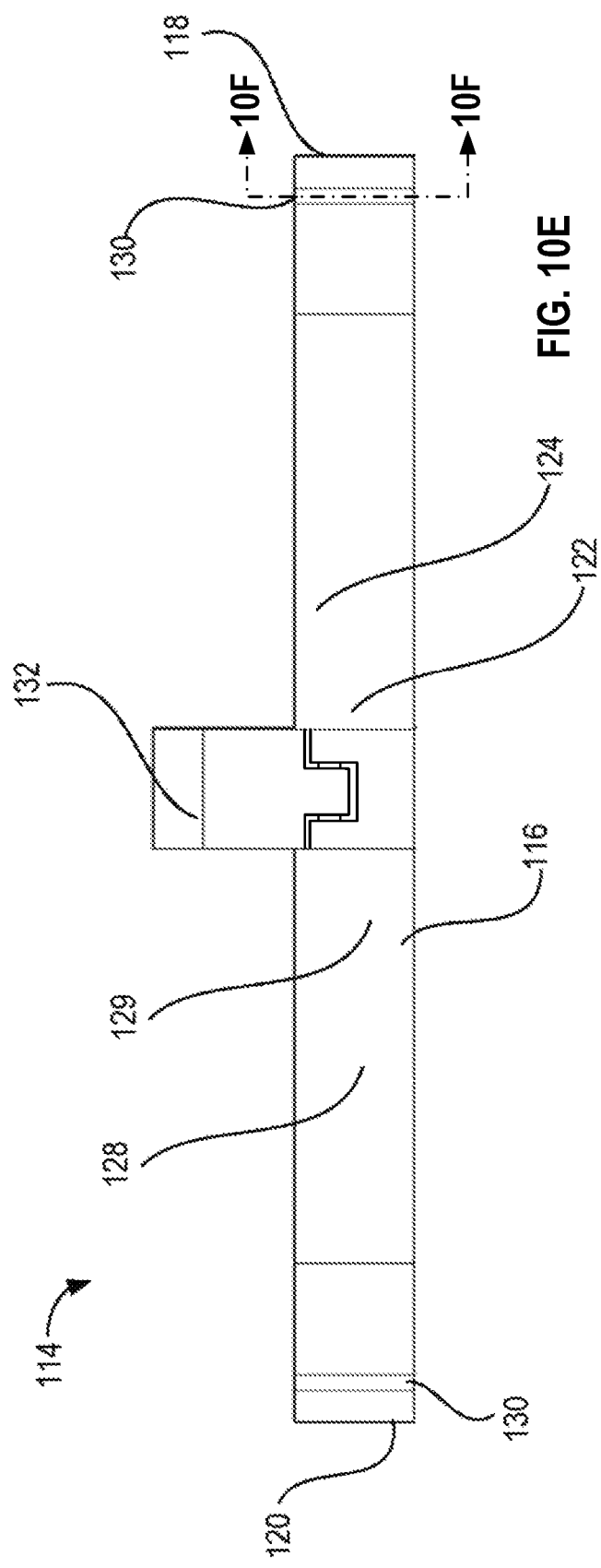
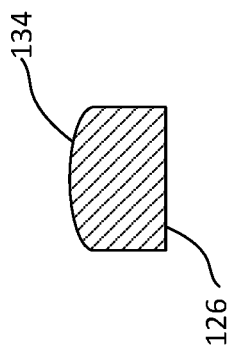
FIG. 10E
FIG. 10F

SYSTEM AND METHOD FOR ROBOT TO PREPARE A FOOD PRODUCT

CROSS-REFERENCE TO RELATED APPLICATIONS

This application claims priority to U.S. Provisional Application No. 62/674,427 filed on May 21, 2018. The above referenced application is incorporated by reference in its entirety.

FIELD OF INVENTION

This disclosure relates to a system, a method, and apparatuses to allow a robot to prepare a food product, like a sandwich.

BACKGROUND

The fast food industry often relies on manual labor to prepare the various food products. A method to increase the automation, such as a robot, to do the various food preparation work would help to reduce the overall manual labor and even reduced variation among the processes. In order to allow a robot to perform these various food preparation tasks, some specific apparatuses may be helpful.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of this disclosure may relate to a basket adapter for engaging a wire basket comprising an elongated primary member having a first end and a second end opposite the first end with a body member extending between the first end and the second end, where the body member has a top surface and a bottom surface. The basket adapter may have a protrusion extending from a central portion of the body member, where the protrusion extends at an acute angle to the top surface of the body member. The body member may have a substantially rectangular cross-section, and the protrusion may have a substantially rectangular cross-section. The body member may include a first groove in the top surface near the first end and a second groove in the top surface near the second end, where the first groove and the second groove are configured to releasably engage side handles of the wire basket. The first groove may have a width at a bottom surface of the first groove that is larger than a width at an opening at a top end of the first groove. The first groove may have a planar bottom surface. The first groove and the second groove may be configured to slidably engage side handles of the wire basket. In addition, the protrusion may have at least two planar surfaces. In some embodiments, the body member has a recess along the central portion of the basket adapter. The acute angle between the protrusion and the top surface may be approximately 40 degrees, or within a range between 25 degrees and 55 degrees. Lastly, the protrusion may be pivotally connected to the elongated primary member.

Other aspects of this disclosure may relate to a basket adapter for engaging a wire basket comprising an elongated primary member having a first end and a second end opposite the first end with a body member extending between the first end and the second end, where the body member has a top surface and a bottom surface. The basket adapter may also include a protrusion extending from a central portion of the body member, where the protrusion extends at an acute angle to the top surface of the body member, and where the protrusion has at least two planar surfaces arranged opposite each other. The body member may include a first groove in the top surface near the first end and a second groove in the top surface near the second end configured to releasably engage side handles of the wire basket using a snap fit connection. The body member may have a substantially rectangular cross-section and may have a cross-sectional height within a range of 0.5 inches and 1.5 inches. In some embodiments, the first groove may have a planar bottom surface, while in other embodiments, the first groove may have a curved bottom surface. The first groove may have a width at a bottom surface of the first groove that is larger than a width at an opening at top end of the first groove. In addition, the first groove and the second groove may be configured to slidably engage side handles of the wire basket. The protrusion may be pivotally connected to the elongated primary member.

Additional aspects of this disclosure may relate to a system for wrapping a food item comprising a wrapping surface, and a wrapping assist device supported by the wrapping surface. The wrapping assist device may include a first strap having a first end, a second end, a first length, a first width and a first center point positioned at a midpoint of the first length and a midpoint of the first width, a second strap having a first end, a second end, a second length, a second width and a second center point positioned at a midpoint of the second length and a midpoint of the second width, where the first strap and the second strap extend perpendicular to each other and are arranged such that the first center point and the second center point are substantially aligned. The first length and the second length may be the same length, and the first width and the second width may be the same width. In some embodiments, the first strap and the second strap may be formed as a unitary member. In addition, the first strap and the second strap may be formed from an elastomeric material, where the wrapping assist device has a weight within a range of 0.10 pounds and 0.5 pounds. The first strap and the second strap may be releasably connected to the wrapping surface at the first center point and the second center point. The wrapping surface may have a recess positioned underneath one of the first strap or the second strap, wherein the recess is spaced a predetermined distance from the first center point. The first end of the first strap and the second end of the first strap may have a thickness that is larger than a thickness of the first strap at the first center point.

Still other aspects of this disclosure may relate to a system for wrapping a food item comprising a system for wrapping a food item comprising a wrapping surface and a wrapping assist device supported by the wrapping surface. The wrapping assist device may comprise a first strap having a first end, a second end, a first length, a first width and a first center point positioned at a midpoint of the first length and a midpoint of the first width and a second strap having a first end, a second end, a second length, a second width and a second center point positioned at a midpoint of the second length and a midpoint of the second width. The first strap and the second strap may be arranged such that the first center point and the second center point are substantially aligned. The first strap and the second strap may be releasably connected to the wrapping surface at the first center point and the second center point. The first length and the second length may be the same length, and the first width and the second width may be the same width. In some embodiments, the first strap and the second strap may be formed as a unitary member. The first strap and the second strap may be formed from an elastomeric material. The elastomeric material may have a first density, where the elastomeric material is filled with a second material having a second density, where the second density has a higher density than the first density. The wrapping surface may have a recess positioned underneath one of the first strap or the second strap, where the recess is spaced a predetermined distance from the first center point. The wrapping surface may have at least two recesses under the first strap and at least two recesses under the second strap. The wrapping assist device may have be releasably connected to the wrapping surface using an adhesive. The wrapping surface may comprise a recess to receive the wrapping assist device, where the recess is substantially X-shaped.

BRIEF DESCRIPTION OF DRAWINGS

To allow for a more full understanding of the present disclosure, it will now be described by way of example, with reference to the accompanying drawings in which:

FIG. 10C depicts a top view of the basket adapter of the system for preparing a food product of FIG. 1;

FIG. 10D depicts a front view of the basket adapter of the system for preparing a food product of FIG. 1;

FIG. 10E depicts a top view of an alternate basket adapter of the system for preparing a food product of FIG. 1;

FIG. 10F depicts a cross-sectional side view of the alternate basket adapter of FIG. 10E;

DETAILED DESCRIPTION

Figure 1:
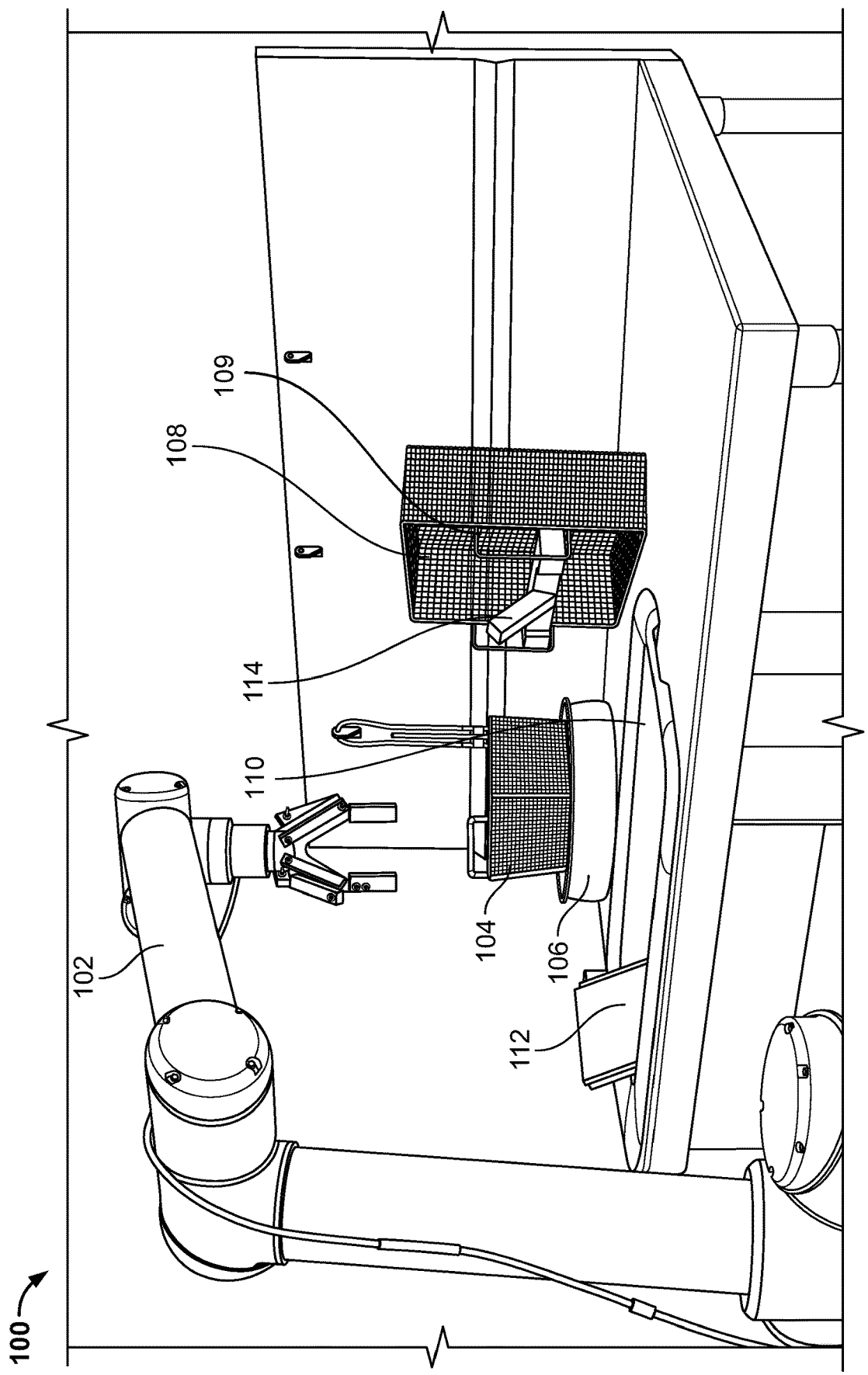
FIG. 1 depicts a perspective view of an exemplary system for preparing a food product as disclosed herein.
Figure 2:
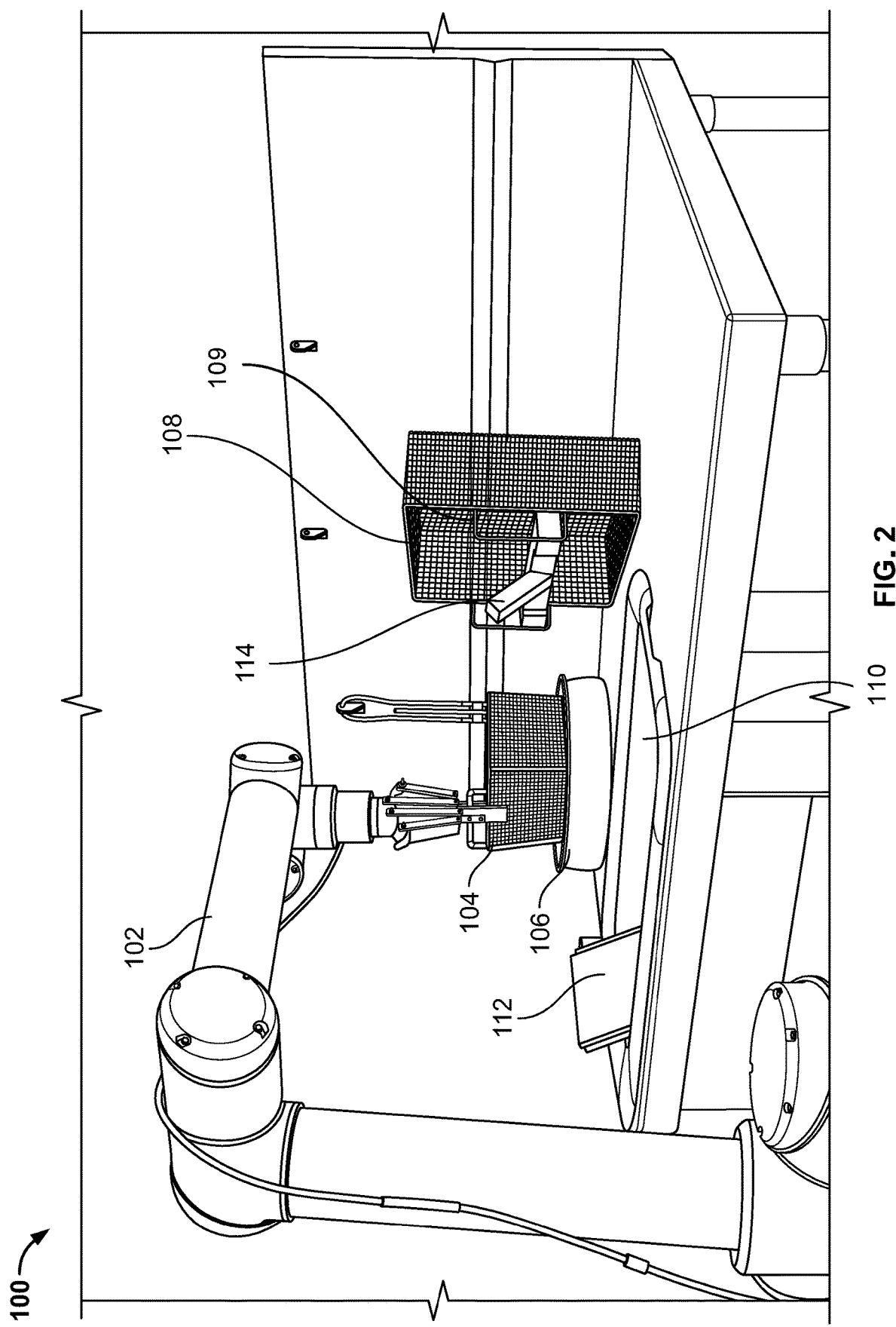
FIG. 2 depicts a perspective view of the system for preparing a food product of FIG. 1 during the process of preparing a food product.
Figure 3:
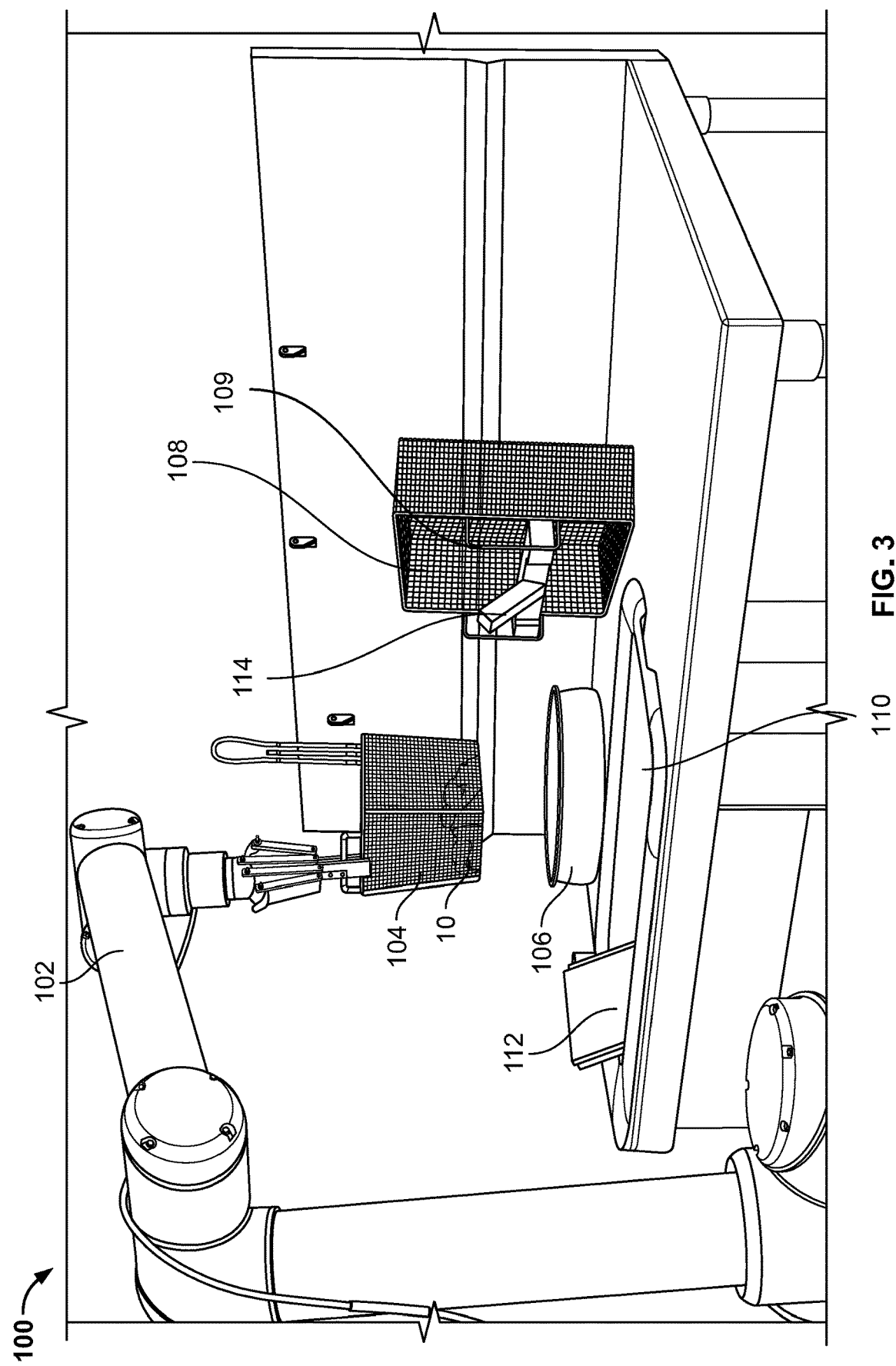
FIG. 3 depicts a perspective view of the system for preparing a food product of FIG. 1 during the process of preparing a food product.
Figure 4:
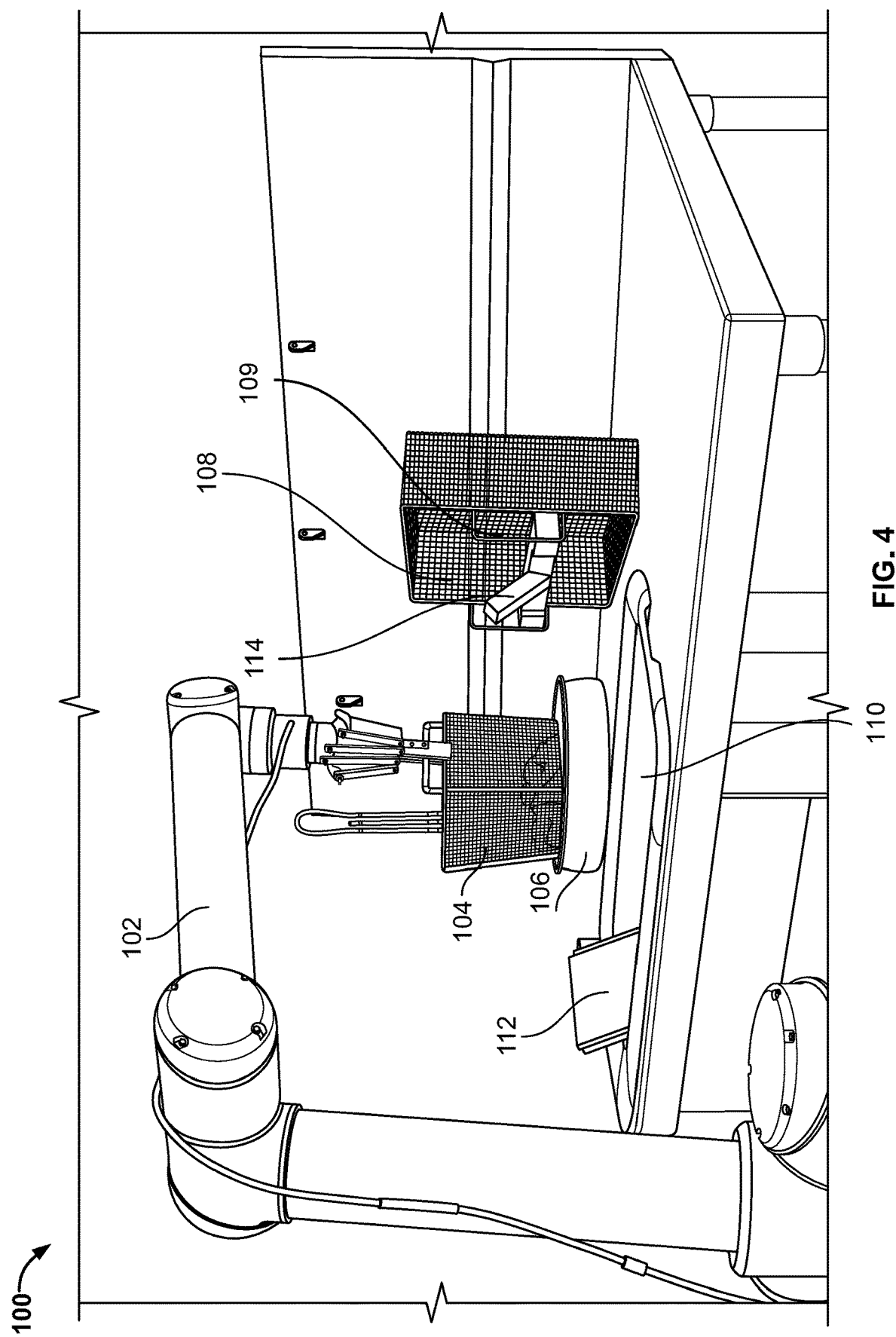
FIG. 4 depicts a perspective view of the system for preparing a food product of FIG. 1 during the process of preparing a food product.
Figure 5:
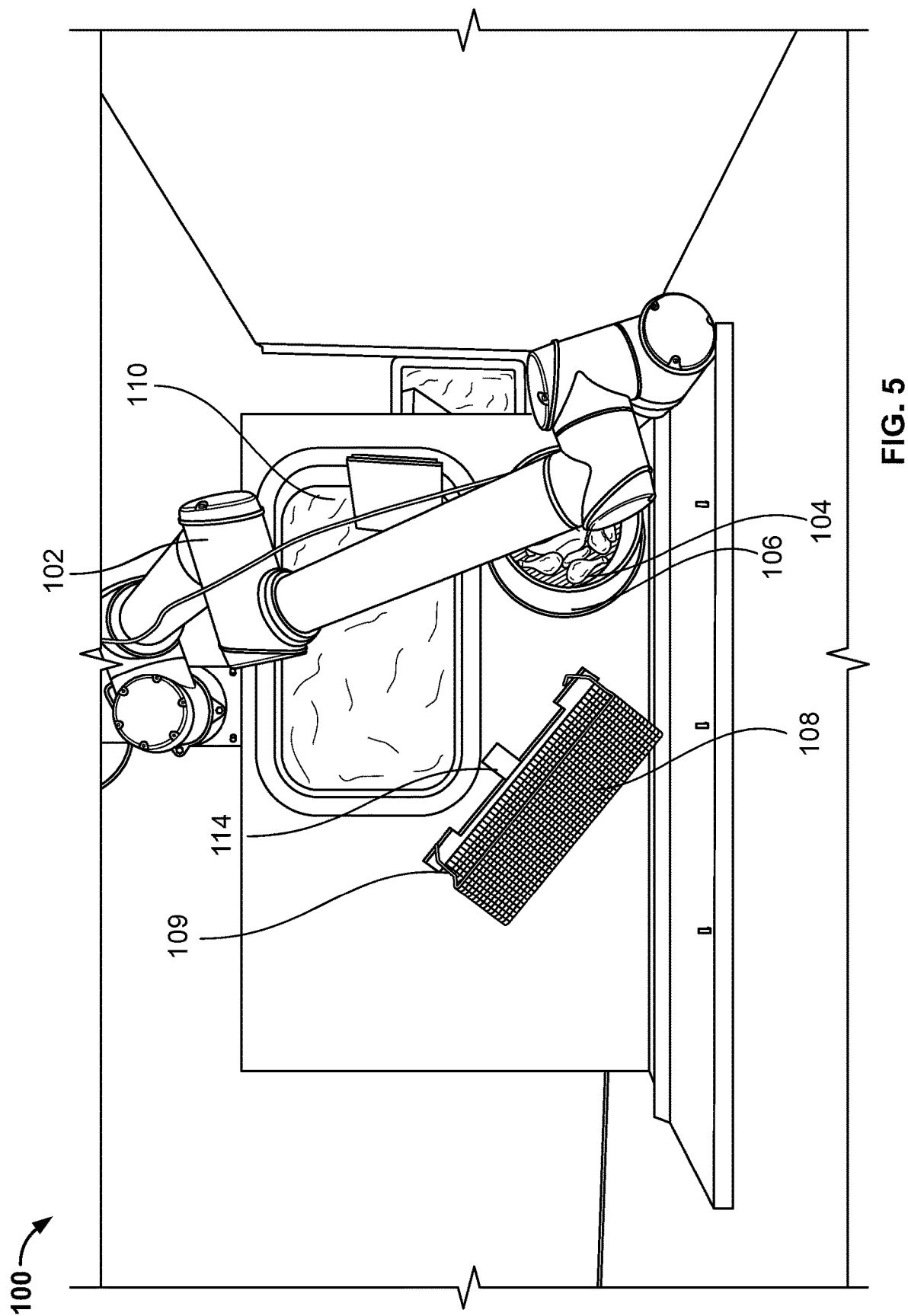
FIG. 5 depicts a perspective view of the system for preparing a food product of FIG. 1 during the process of preparing a food product.

In the following description of various example systems and structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention, unless explicitly specified by the claims. The term "plurality" may be used to refer to a number greater than one. The reader is also advised that the attached drawings are not necessarily drawn to scale.

In general, this disclosure relates to system 100 using a robotic arm to prepare a food product, such as preparing chicken or other meat to the fried. Additionally, the system 200 may allow a robotic arm to prepare a food item, such as a sandwich, and then wrap the food item, in this case an assembled sandwich, in a wrapper for distribution. In both systems 100, 200 specific apparatuses may be used to allow the robotic arm to prepare the food items.

FIGS. 1-17 illustrate system 100 and method for preparing a meat 10 or meat product. The system 100 may comprise a robotic arm 102, a first wire basket 104 configured to slidably engage a first container 106, where the first wire basket 104 may hold the meat 10 when placing the meat 10 into a liquid solution, such as buttermilk or similar mixture, held by the first container 106, and a second wire basket 108 configured to scoop the meat 10 from a second container 110, where the second container 110 may contain flour or some sort of dry coating provided to adhere to the meat after it is coated with the liquid solution held in the first container 106. The system 100 may further comprise a stirrer or spatula type device 112.

Figure 6:
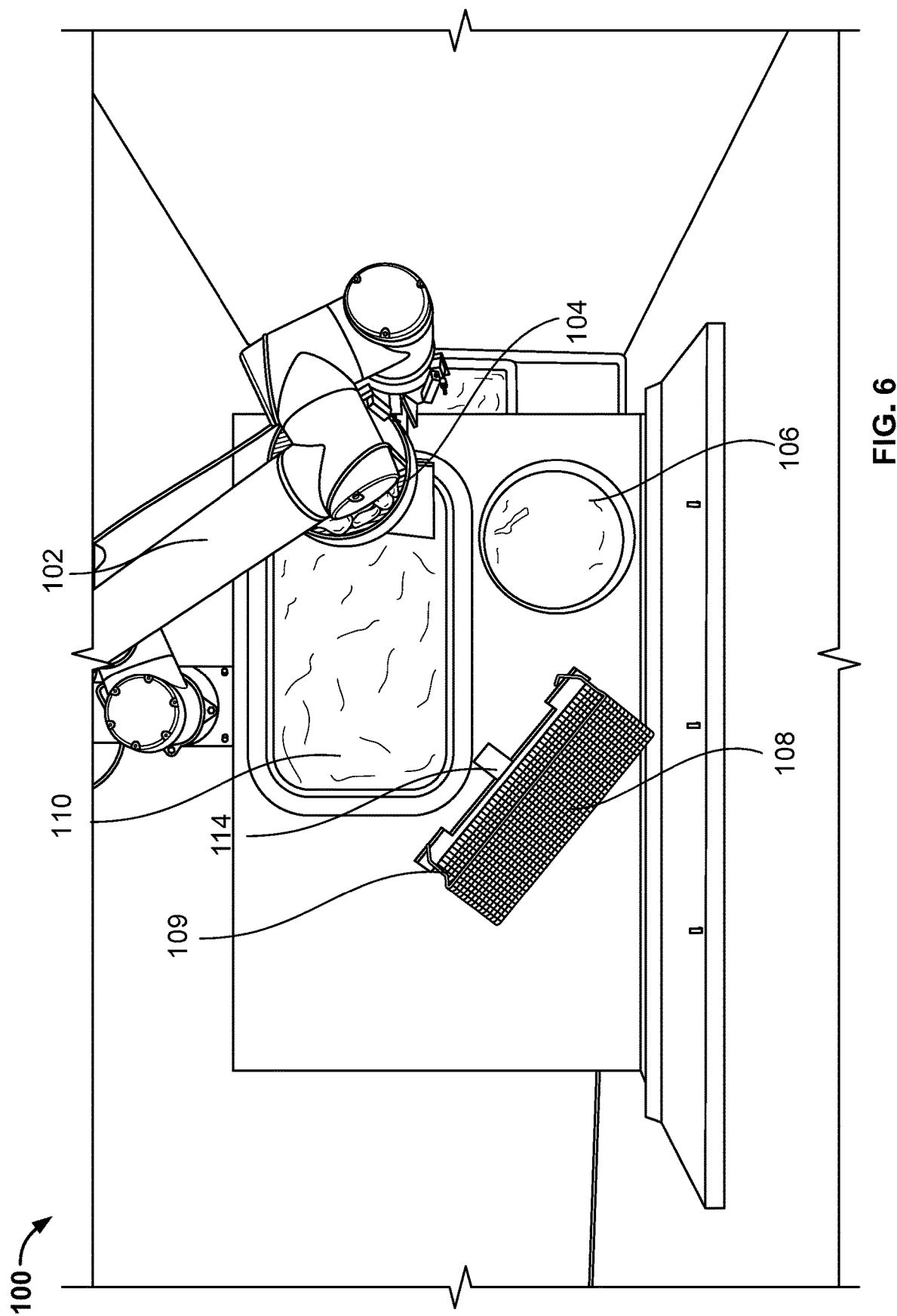
FIG. 6 depicts a perspective view of the system for preparing a food product of FIG. 1 during the process of preparing a food product.
Figure 7:
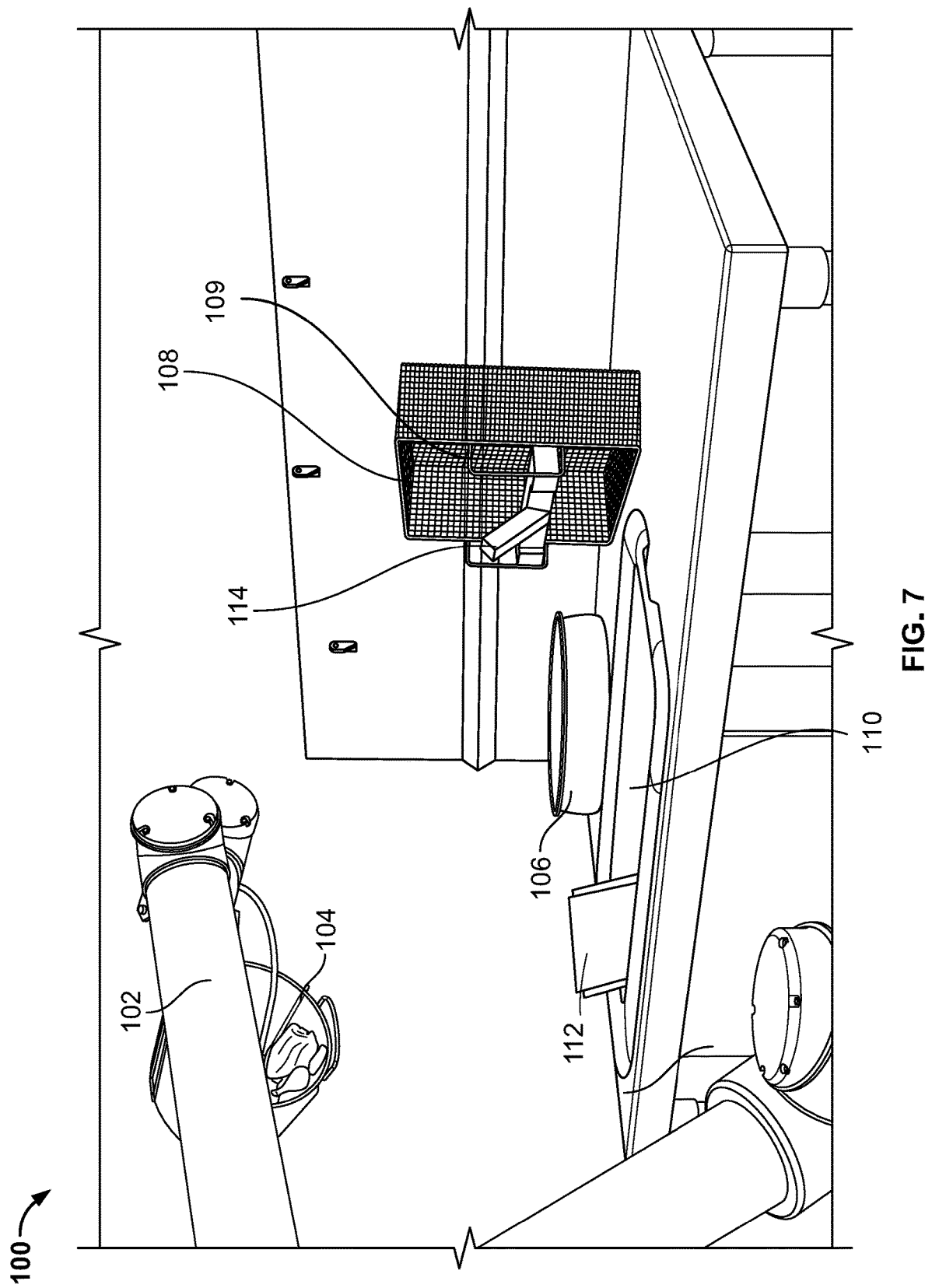
FIG. 7 depicts a perspective view of the system for preparing a food product of FIG. 1 during the process of preparing a food product.
Figure 8:
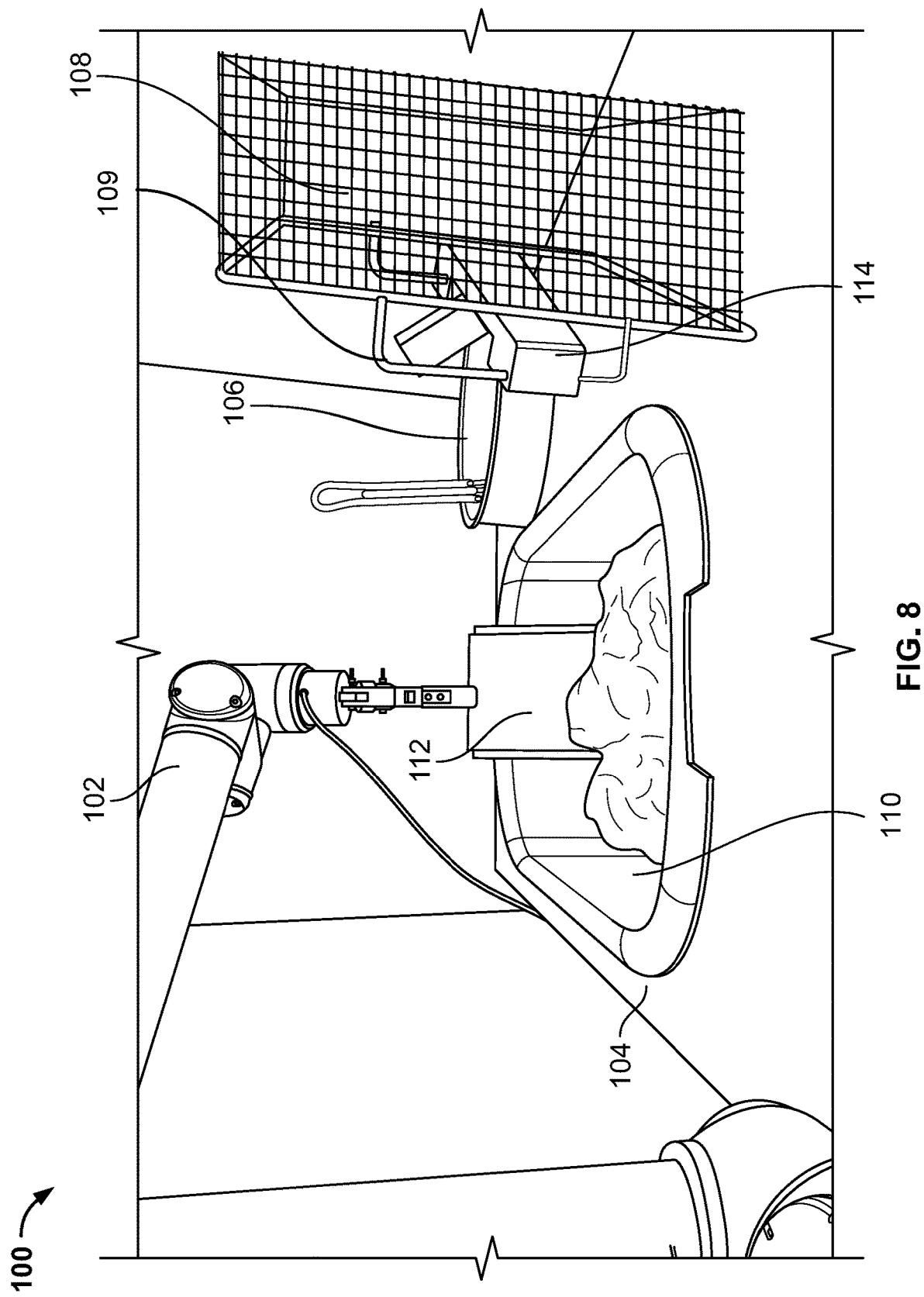
FIG. 8 depicts a perspective view of the system for preparing a food product of FIG. 1 during the process of preparing a food product.
Figure 9:
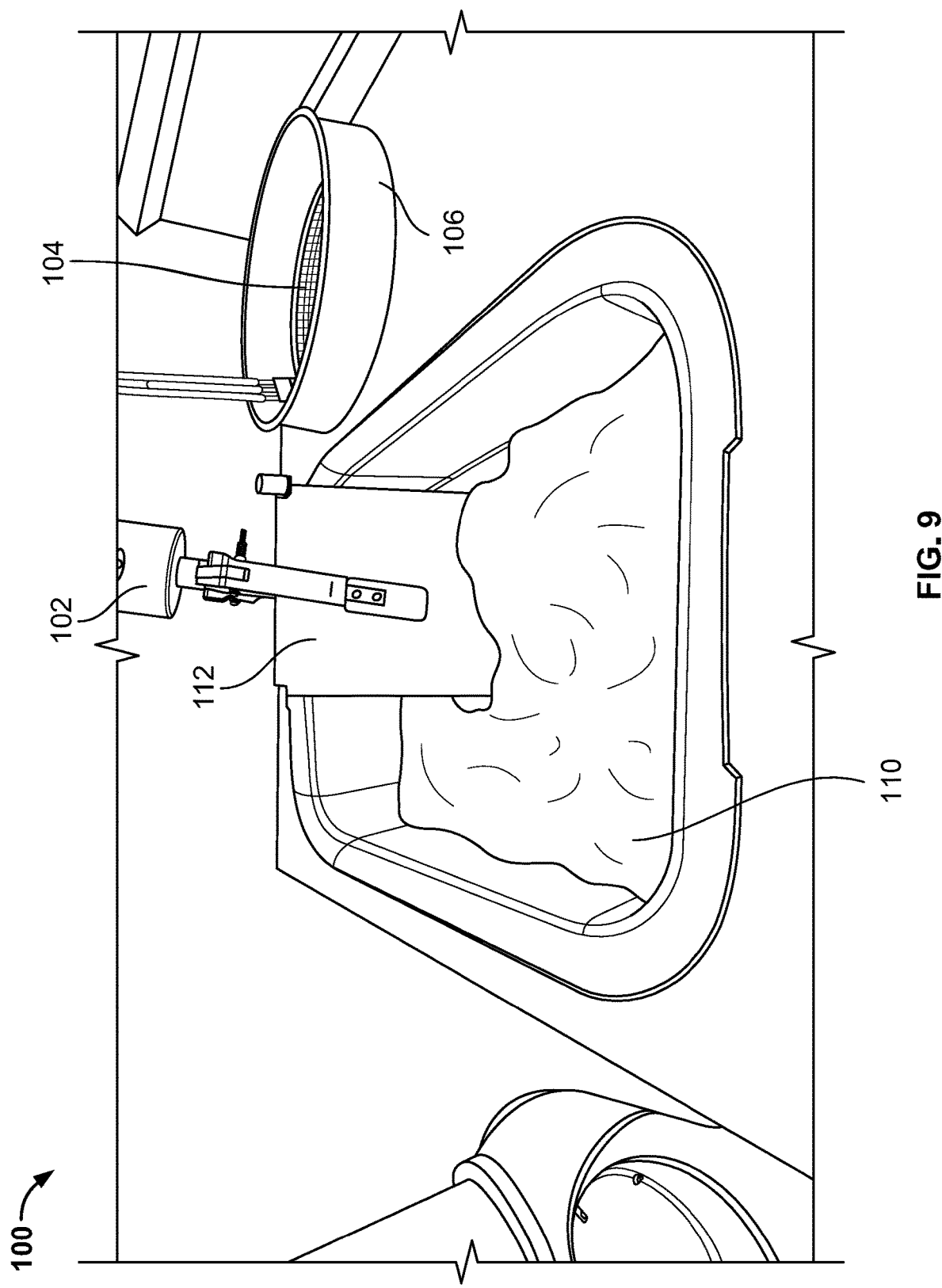
FIG. 9 depicts a perspective view of the system for preparing a food product of FIG. 1 during the process of preparing a food product.
Figure 10:
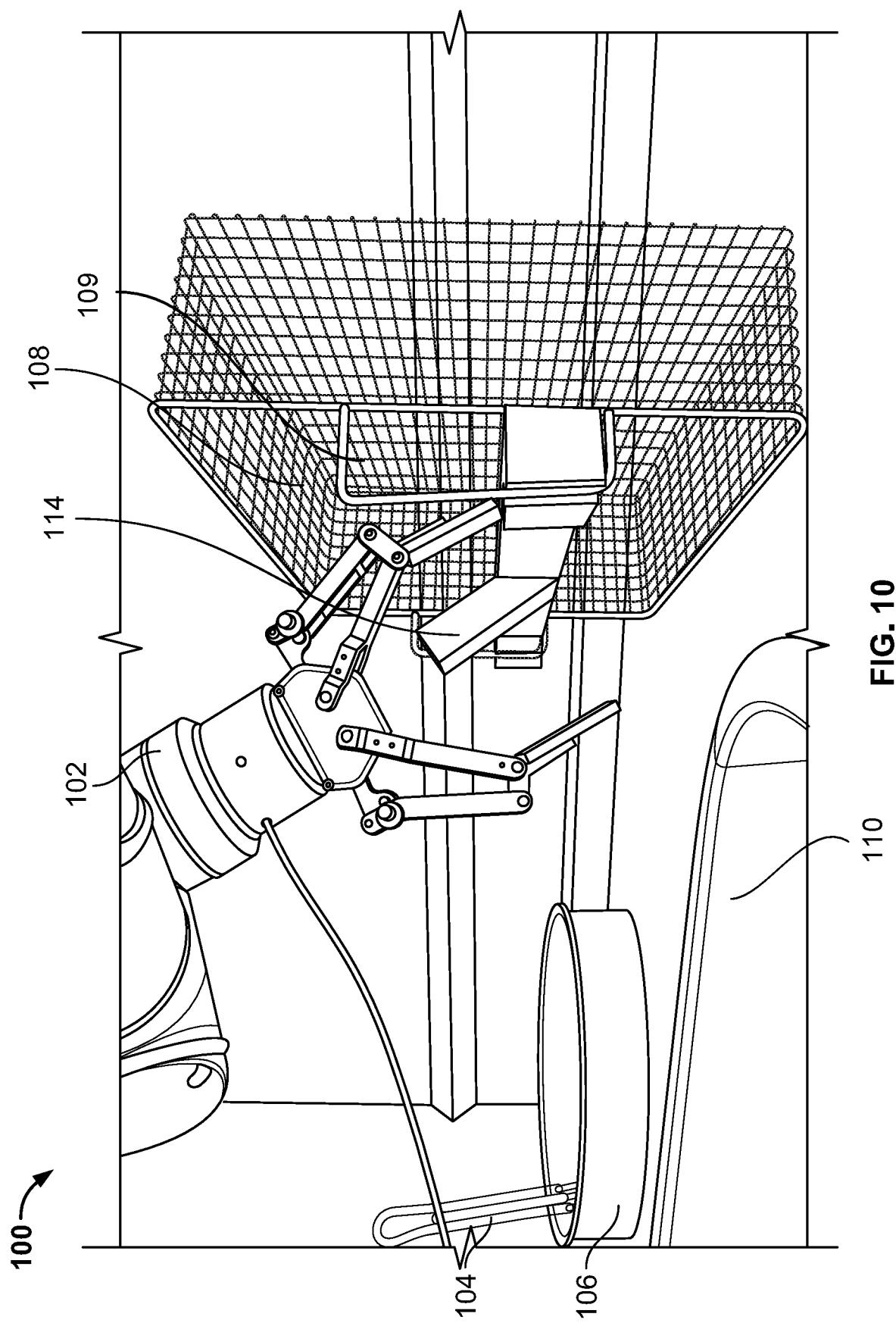
FIG. 10 depicts a perspective view of the system for preparing a food product of FIG. 1 during the process of preparing a food product.
Figure 10A:
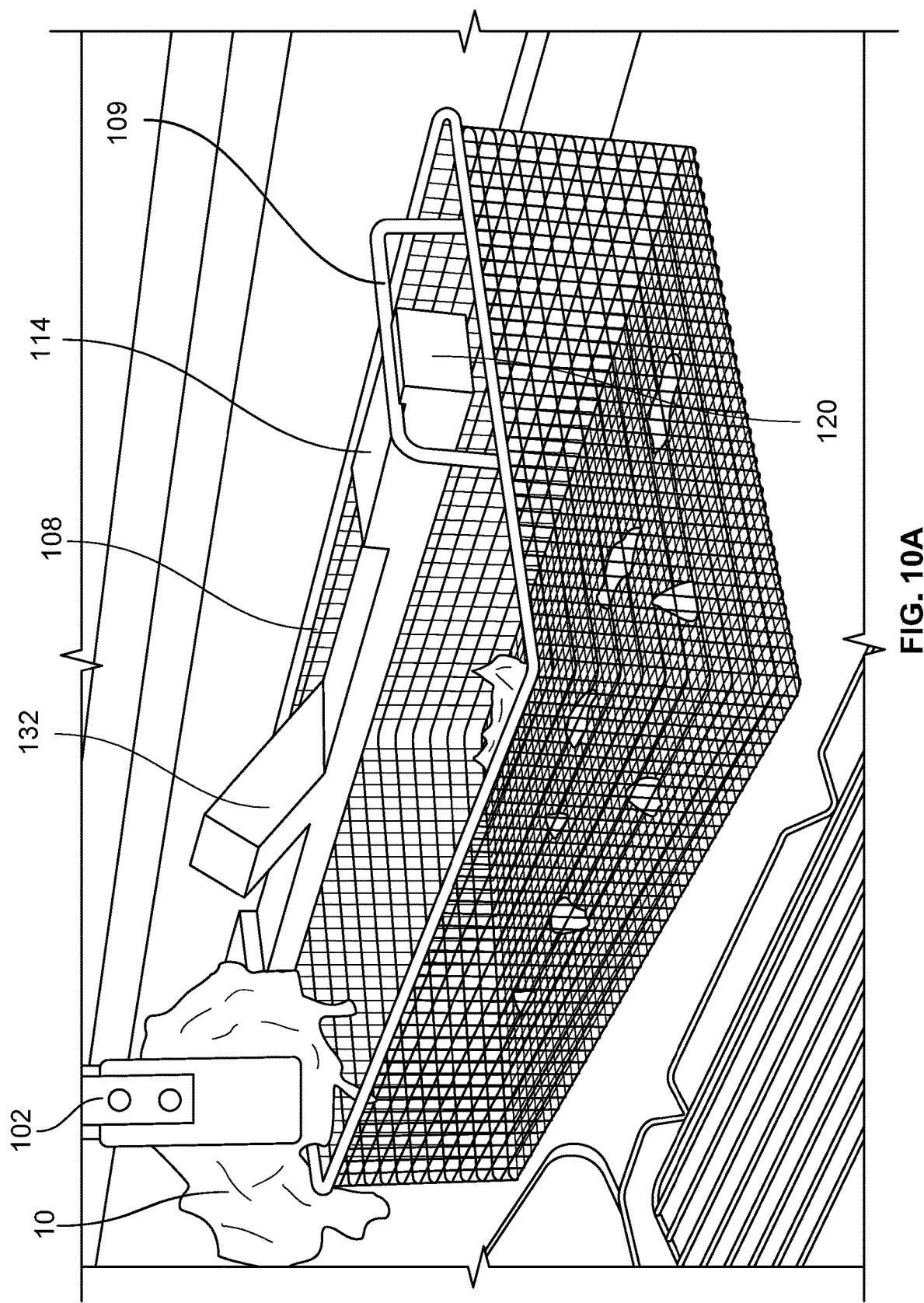
FIG. 10A depicts a perspective view of the basket adapter attached to a wire basket of the system for preparing a food product of FIG. 1.
Figure 10B:
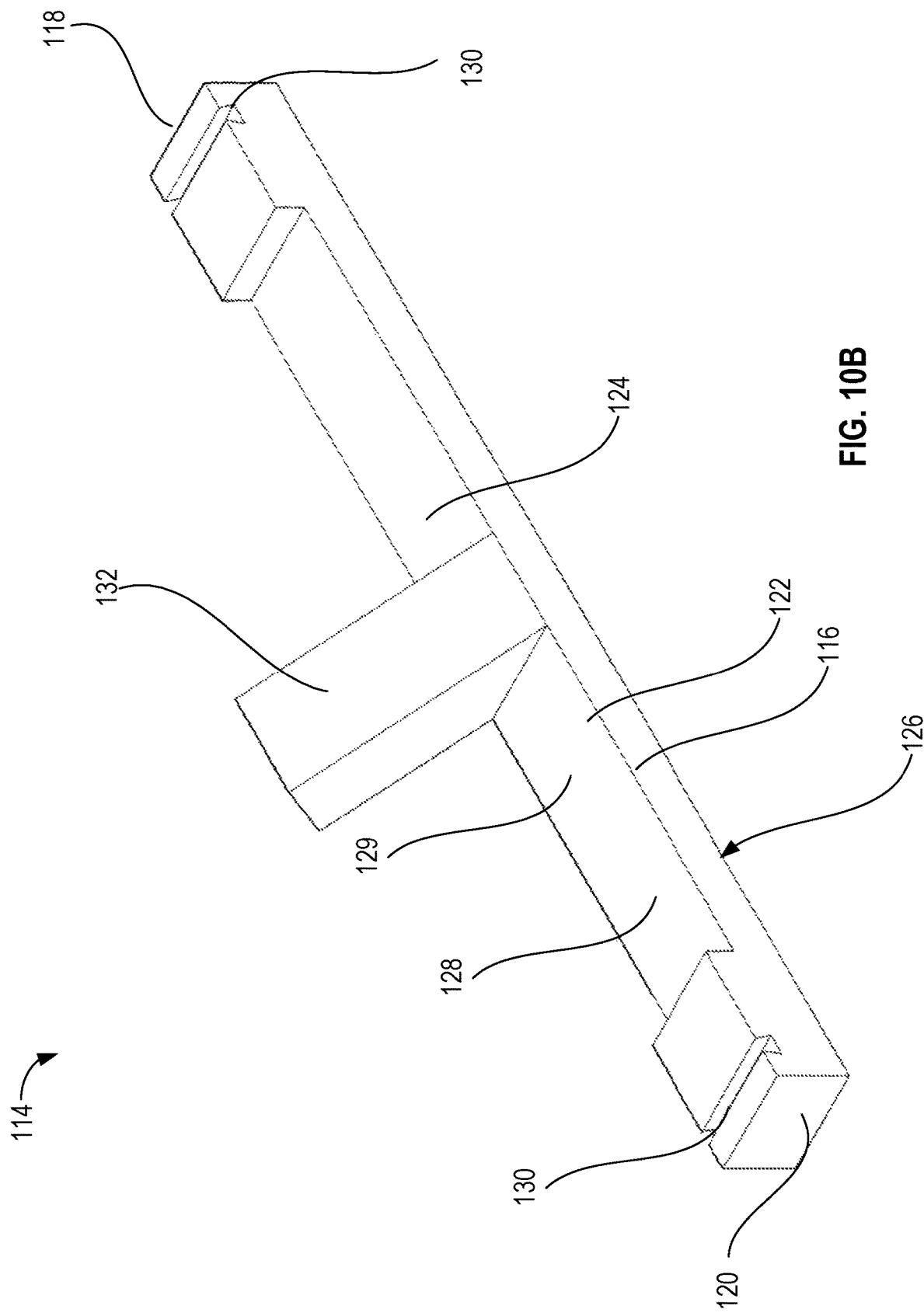
FIG. 10B depicts an isometric view of the basket adapter of the system for preparing a food product of FIG. 1.
Figure 11:
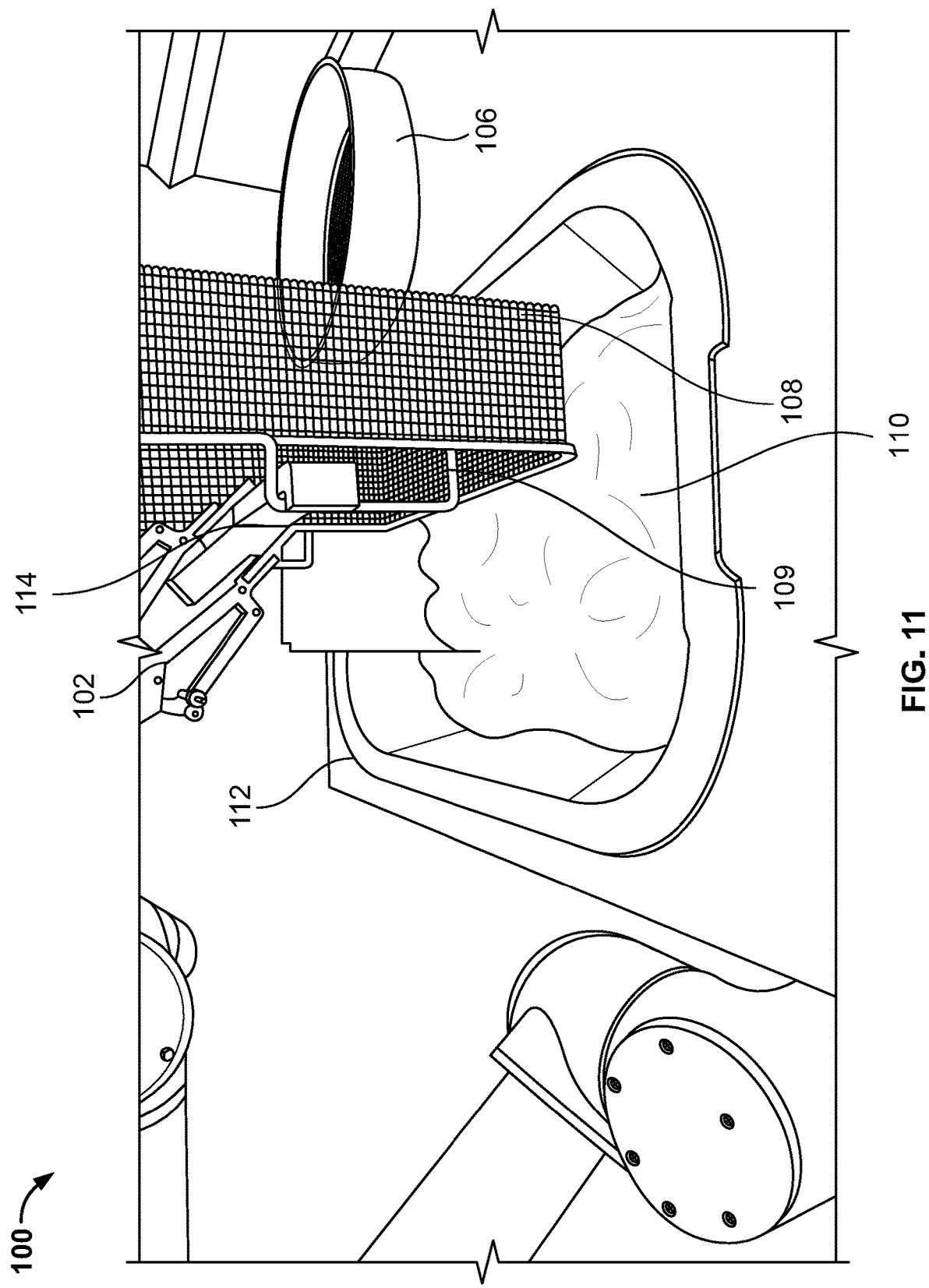
FIG. 11 depicts a perspective view of the system for preparing a food product of FIG. 1 during the process of preparing a food product.
Figure 12:
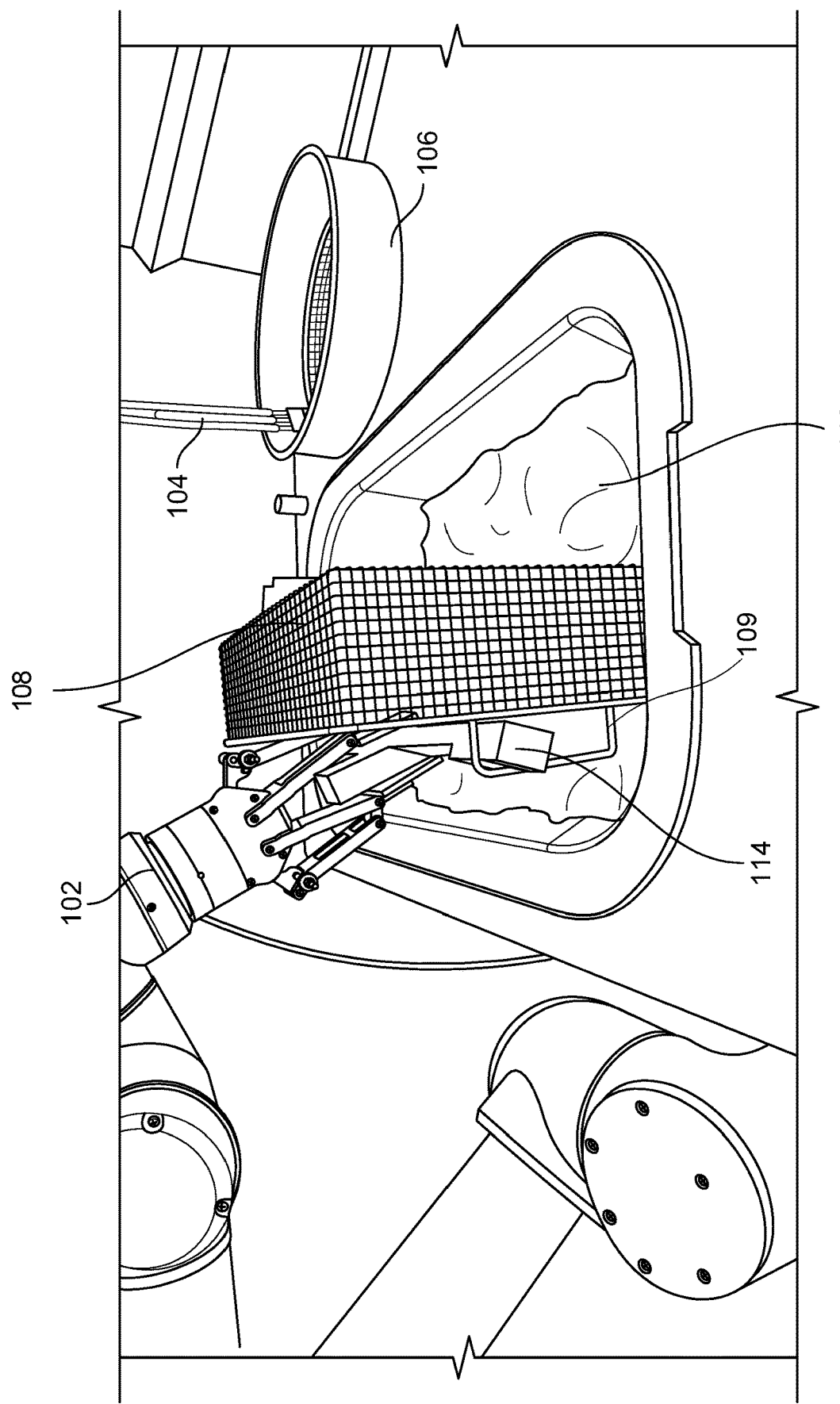
FIG. 12 depicts a perspective view of the system for preparing a food product of FIG. 1 during the process of preparing a food product.
Figure 13:
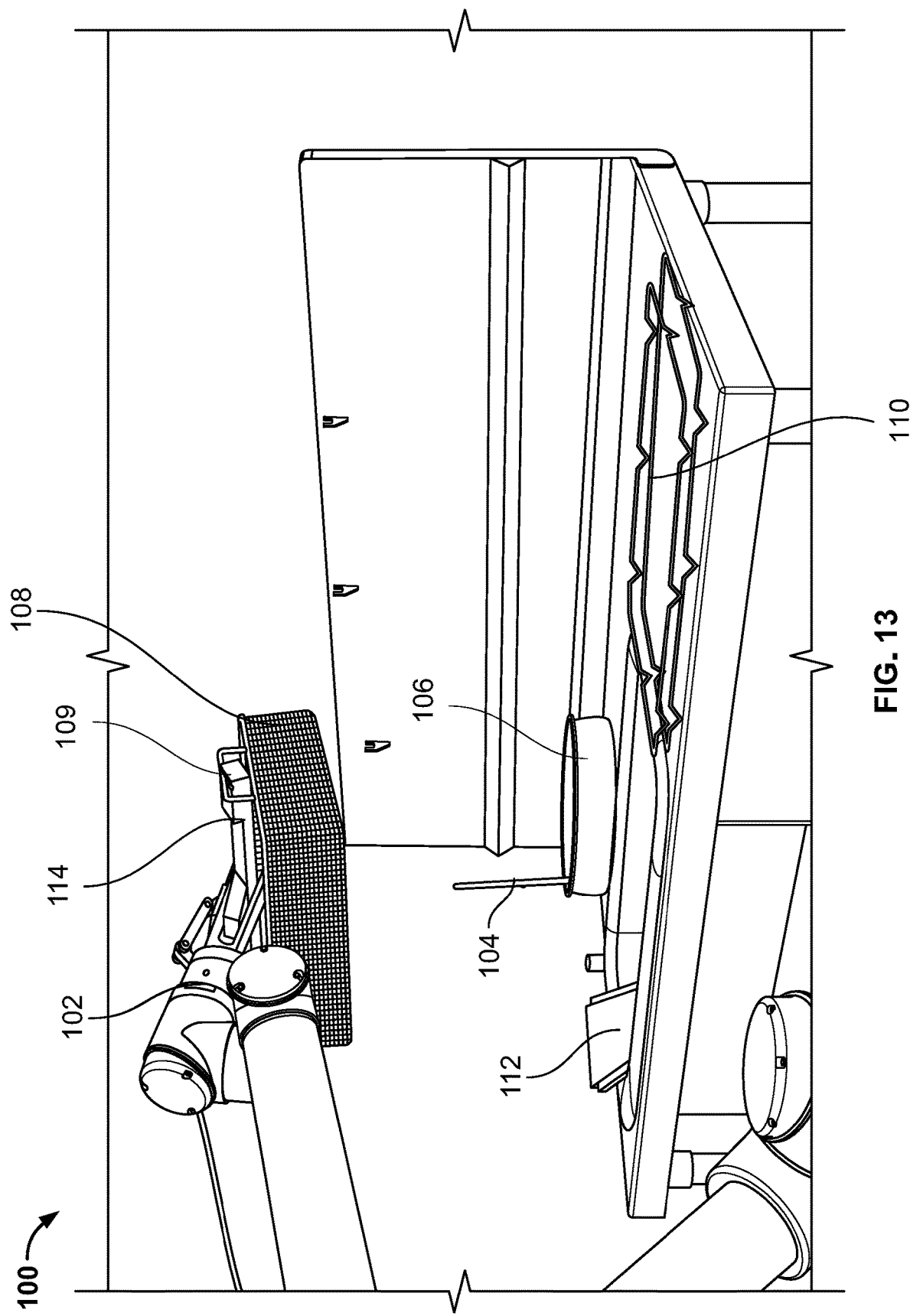
FIG. 13 depicts a perspective view of the system for preparing a food product of FIG. 1 during the process of preparing a food product.
Figure 14:
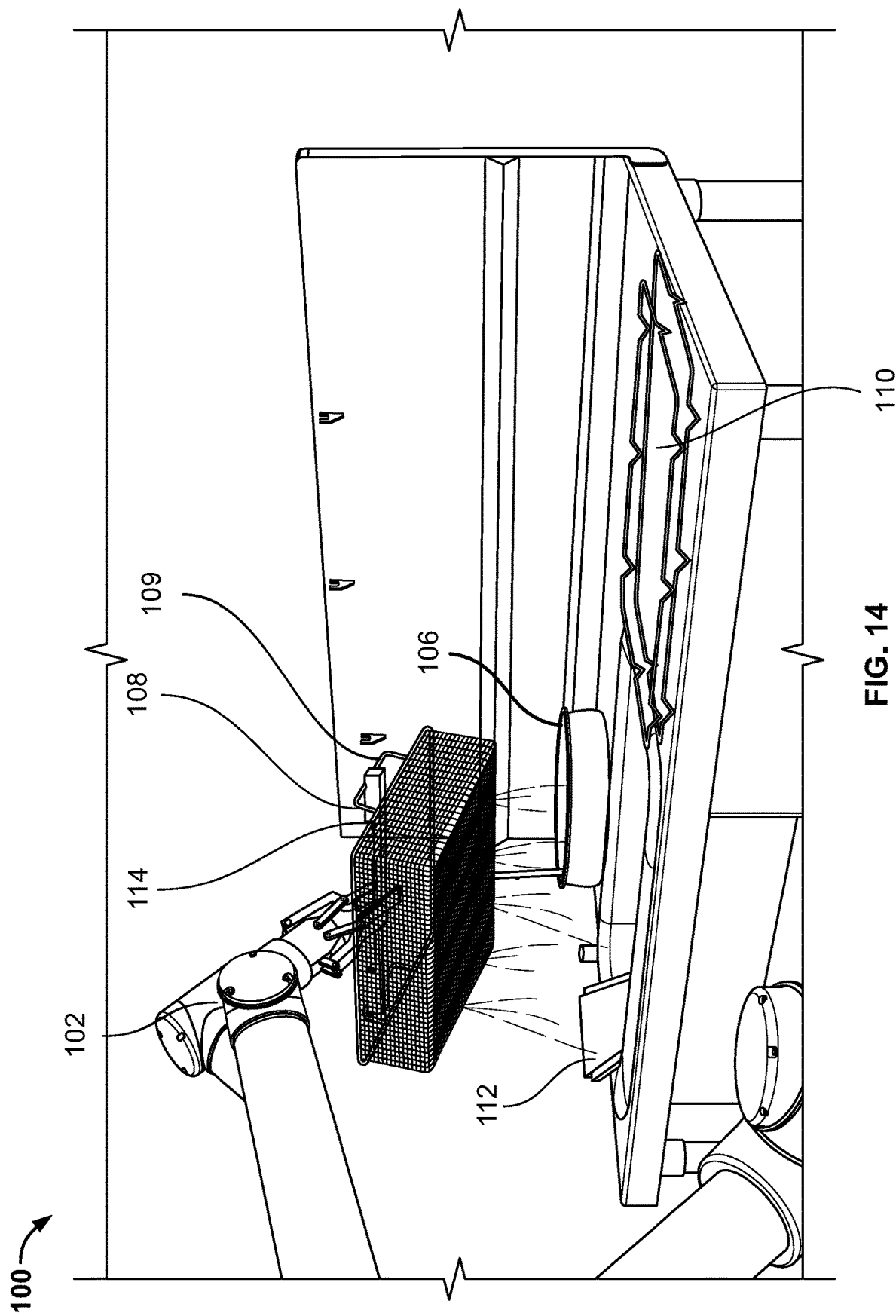
FIG. 14 depicts a perspective view of the system for preparing a food product of FIG. 1 during the process of preparing a food product.
Figure 15:
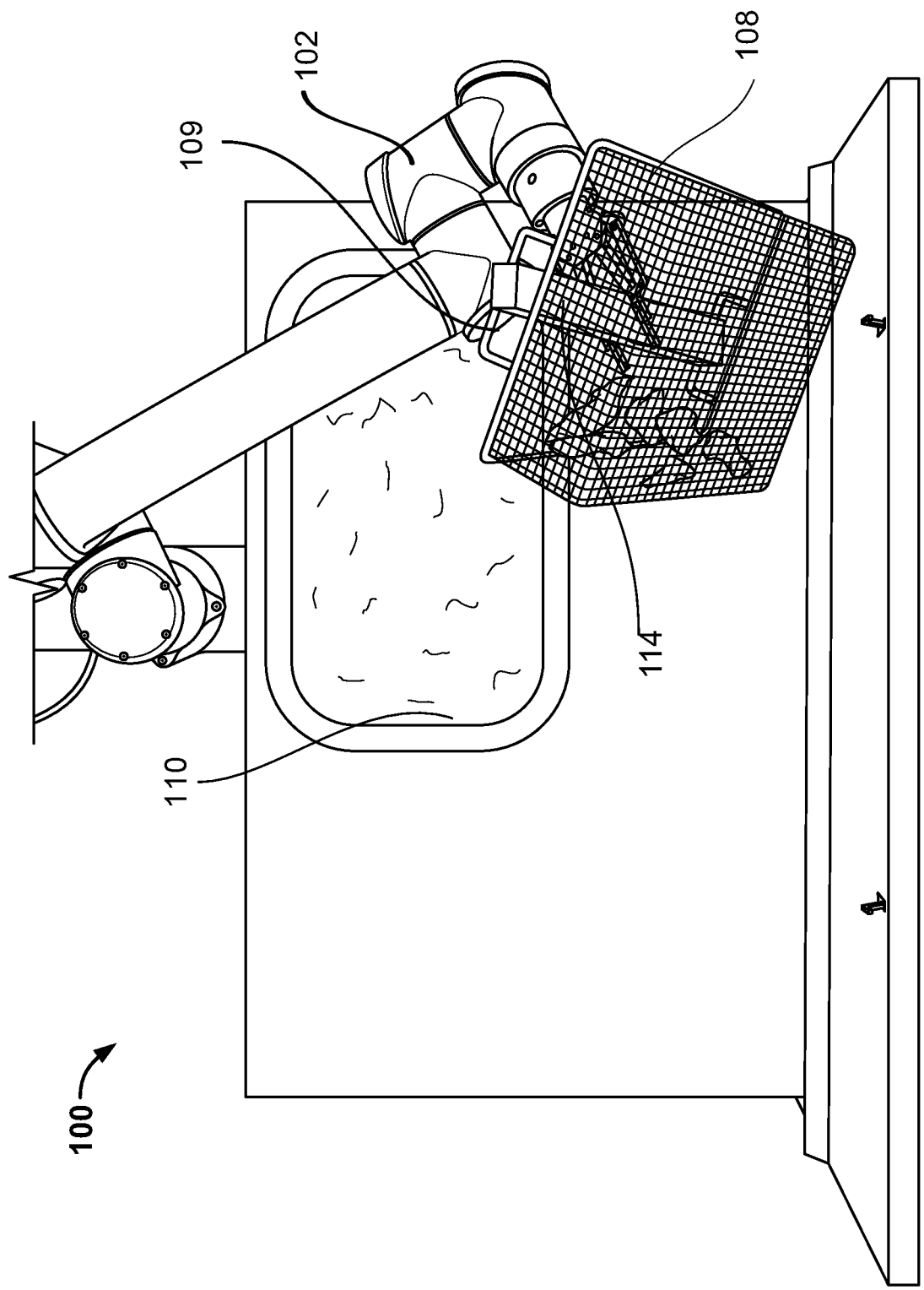
FIG. 15 depicts a perspective view of the system for preparing a food product of FIG. 1 during the process of preparing a food product.
Figure 16:
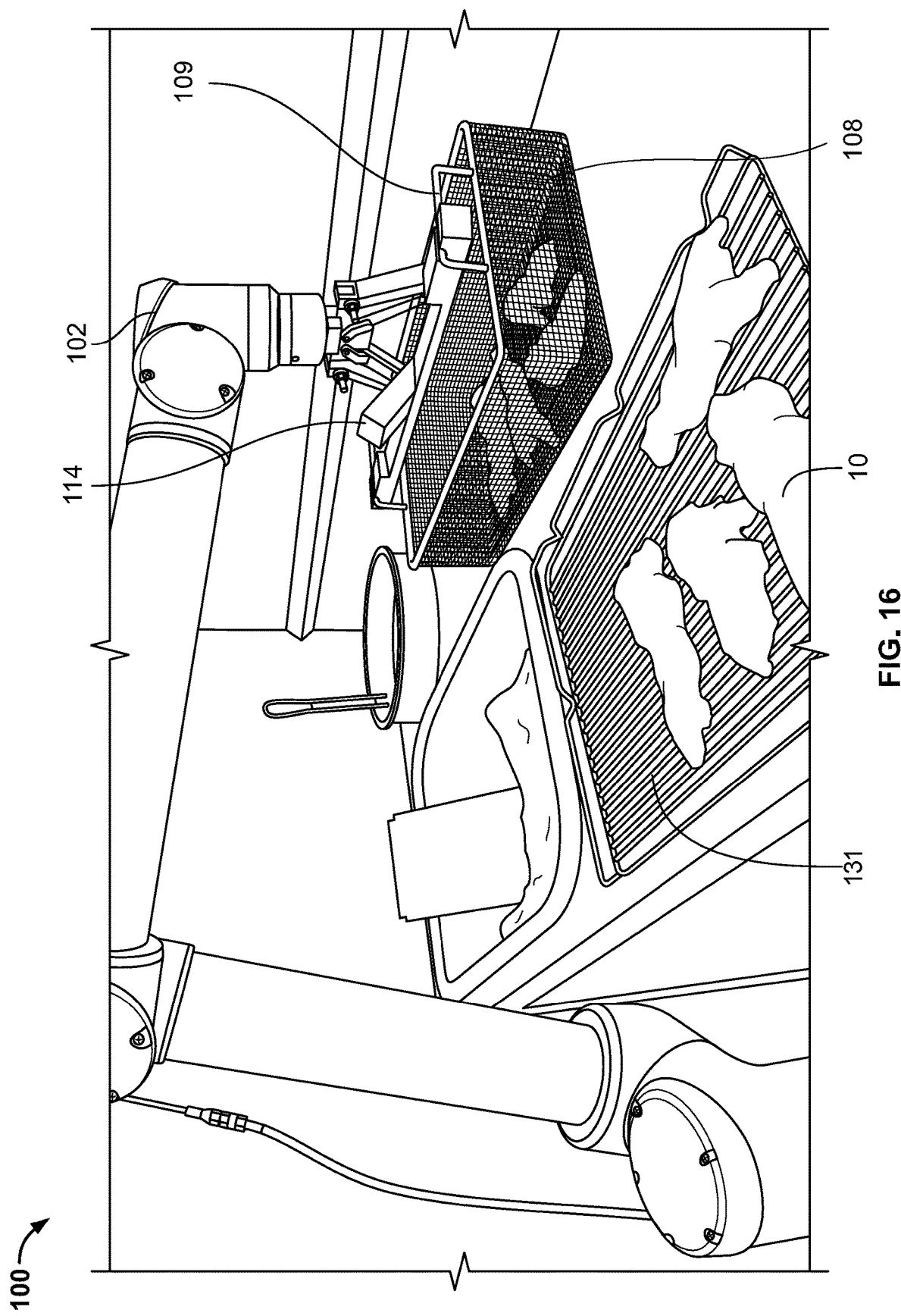
FIG. 16 depicts a perspective view of the system for preparing a food product of FIG. 1 during the process of preparing a food product.
Figure 17:
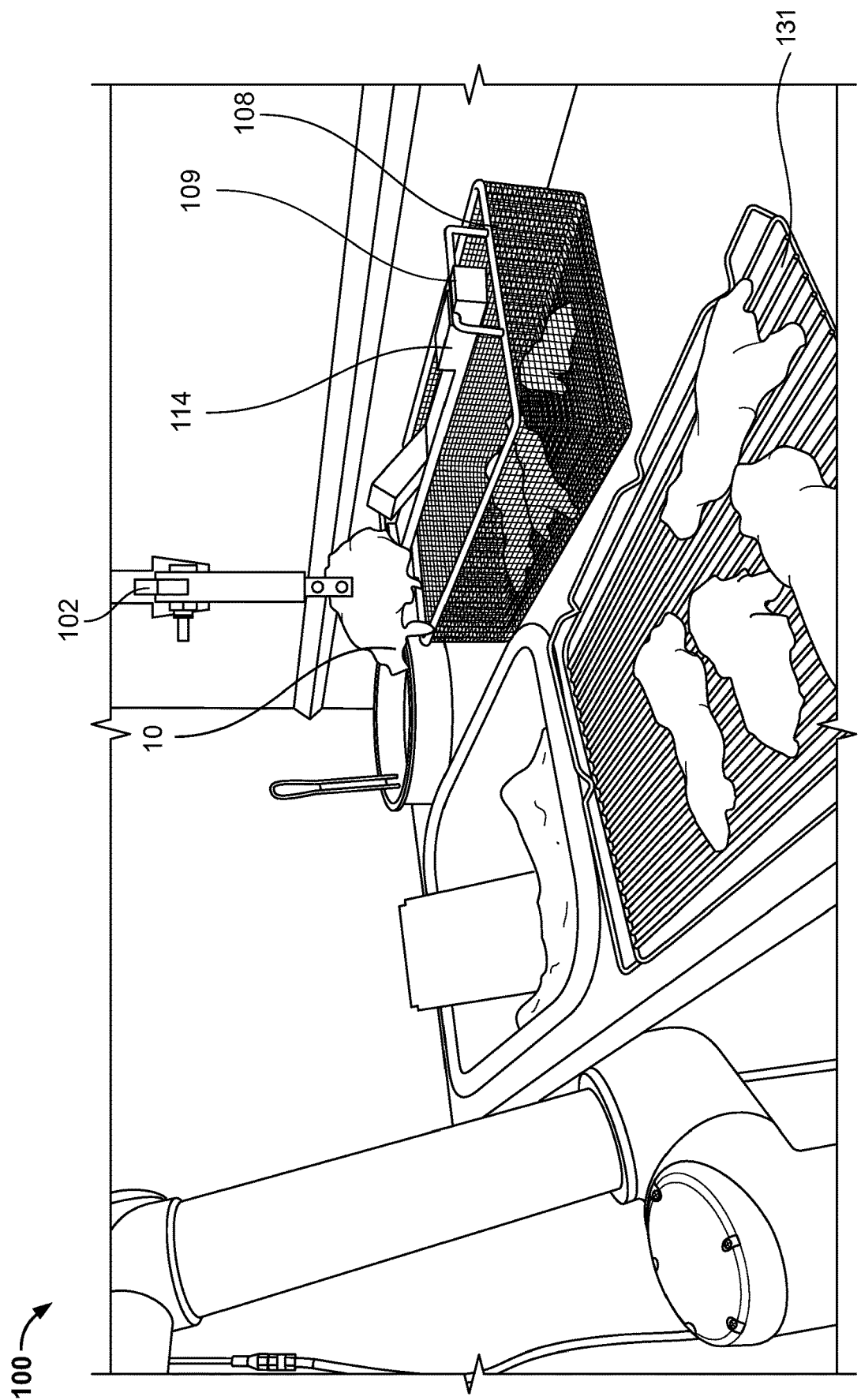
FIG. 17 depicts a perspective view of the system for preparing a food product of FIG. 1 during the process of preparing a food product.
Figure 18:
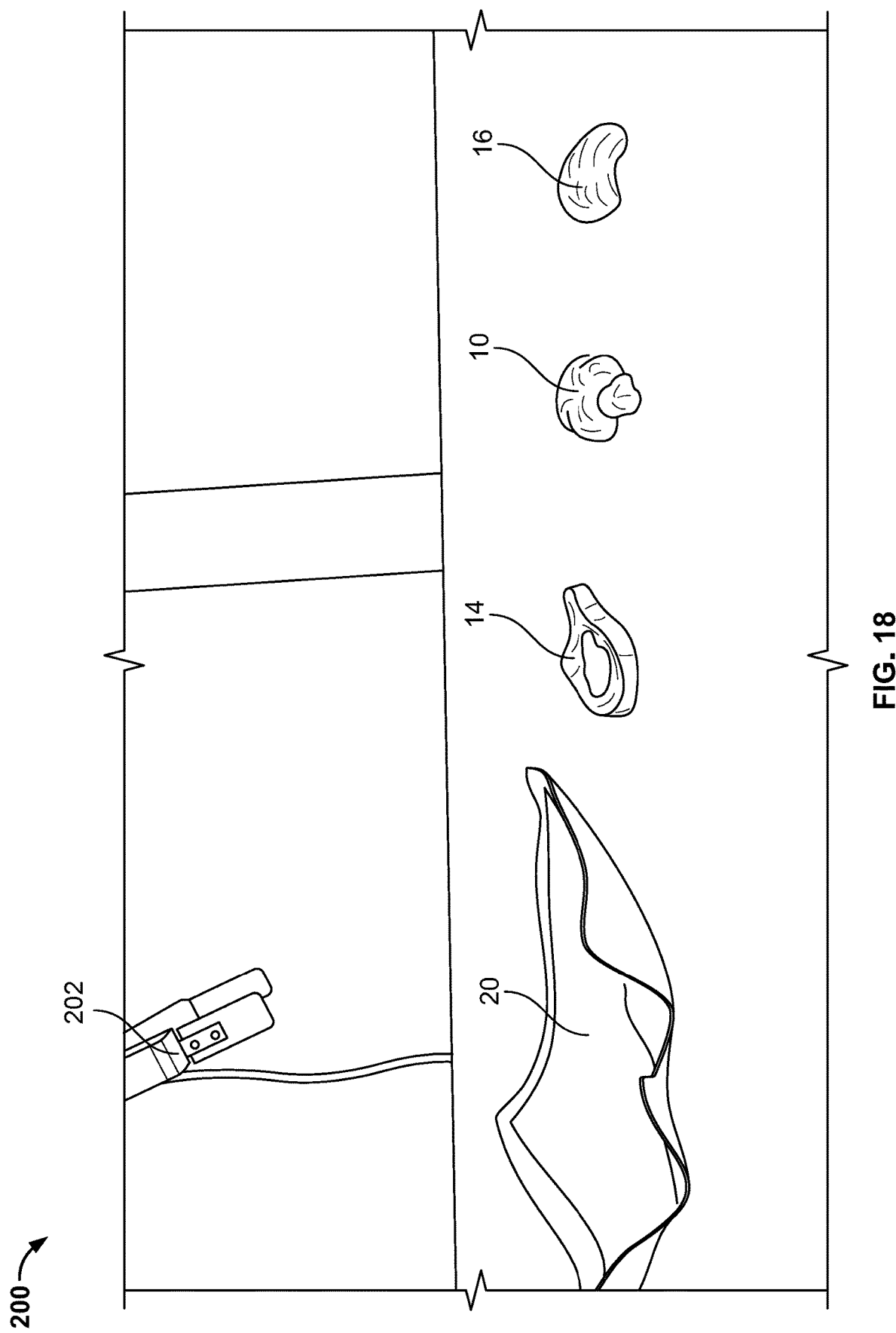
FIG. 18 depicts a perspective view of an exemplary system for preparing a food product as disclosed herein.
Figure 19:
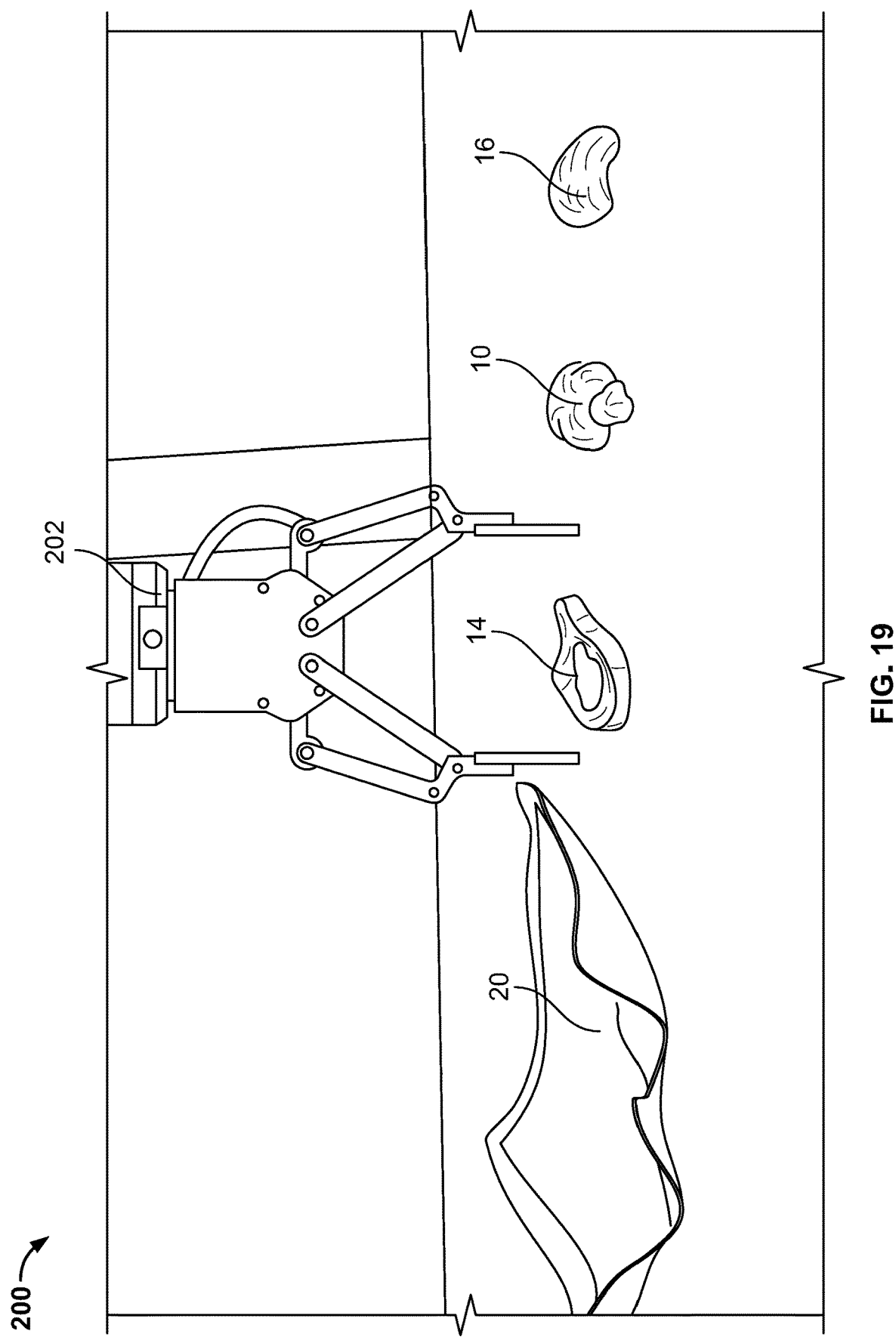
FIG. 19 depicts the system for preparing a food product of FIG. 18 during the process of preparing a food product.
Figure 20:
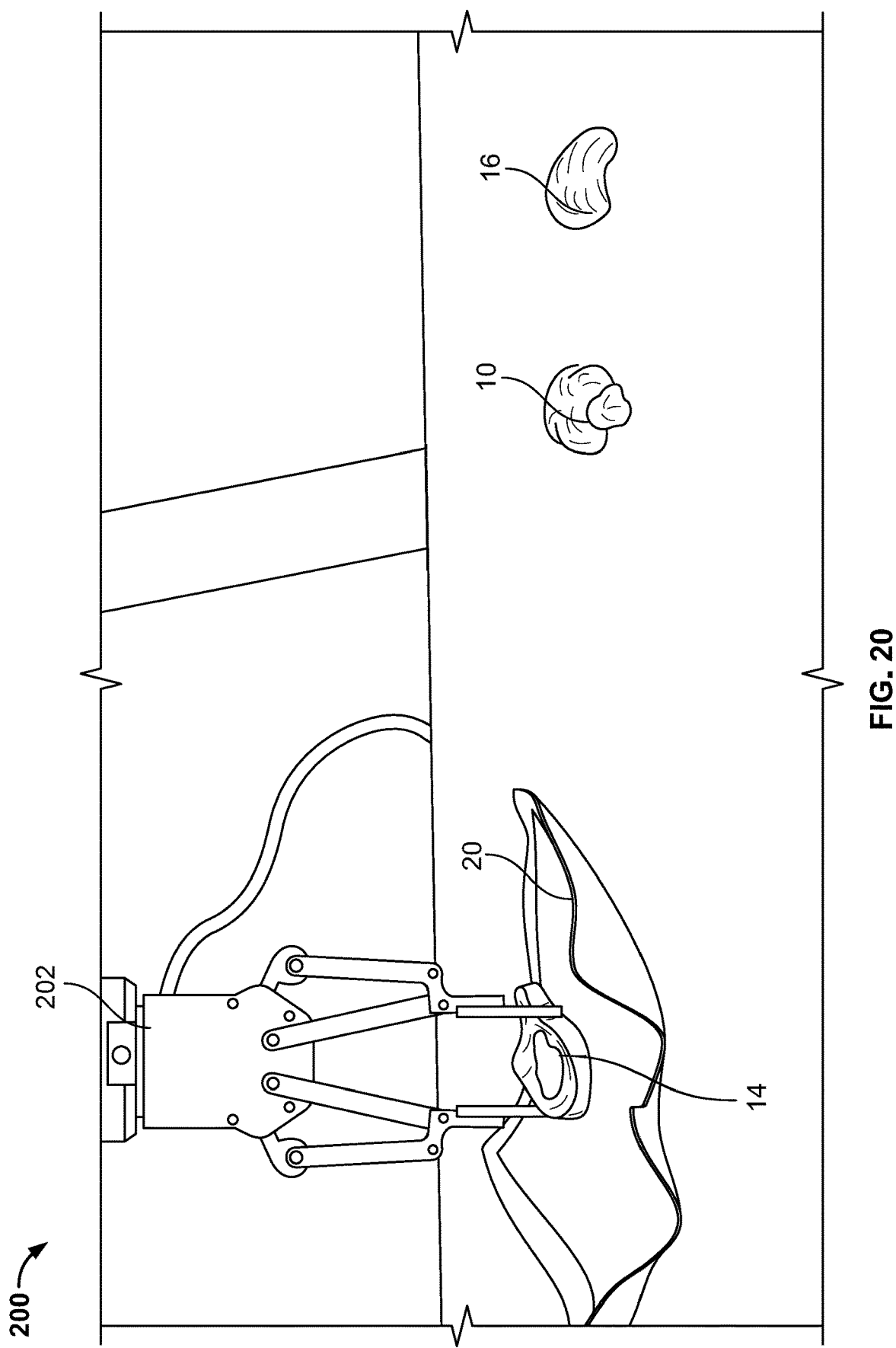
FIG. 20 depicts a perspective view of the system for preparing a food product of FIG. 18 during the process of preparing a food product.
Figure 21:
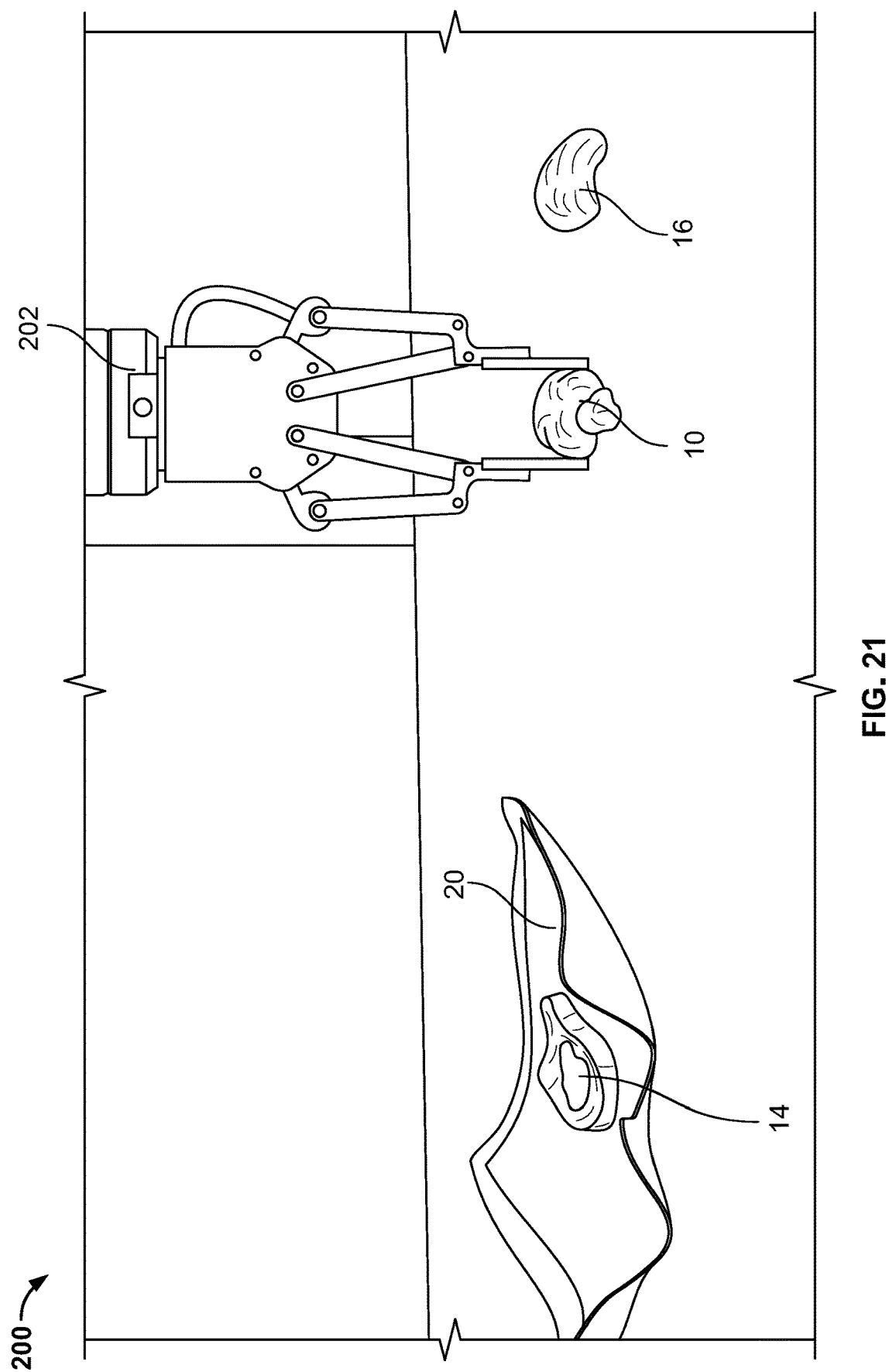
FIG. 21 depicts a perspective view of the system for preparing a food product of FIG. 18 during the process of preparing a food product.
Figure 22:
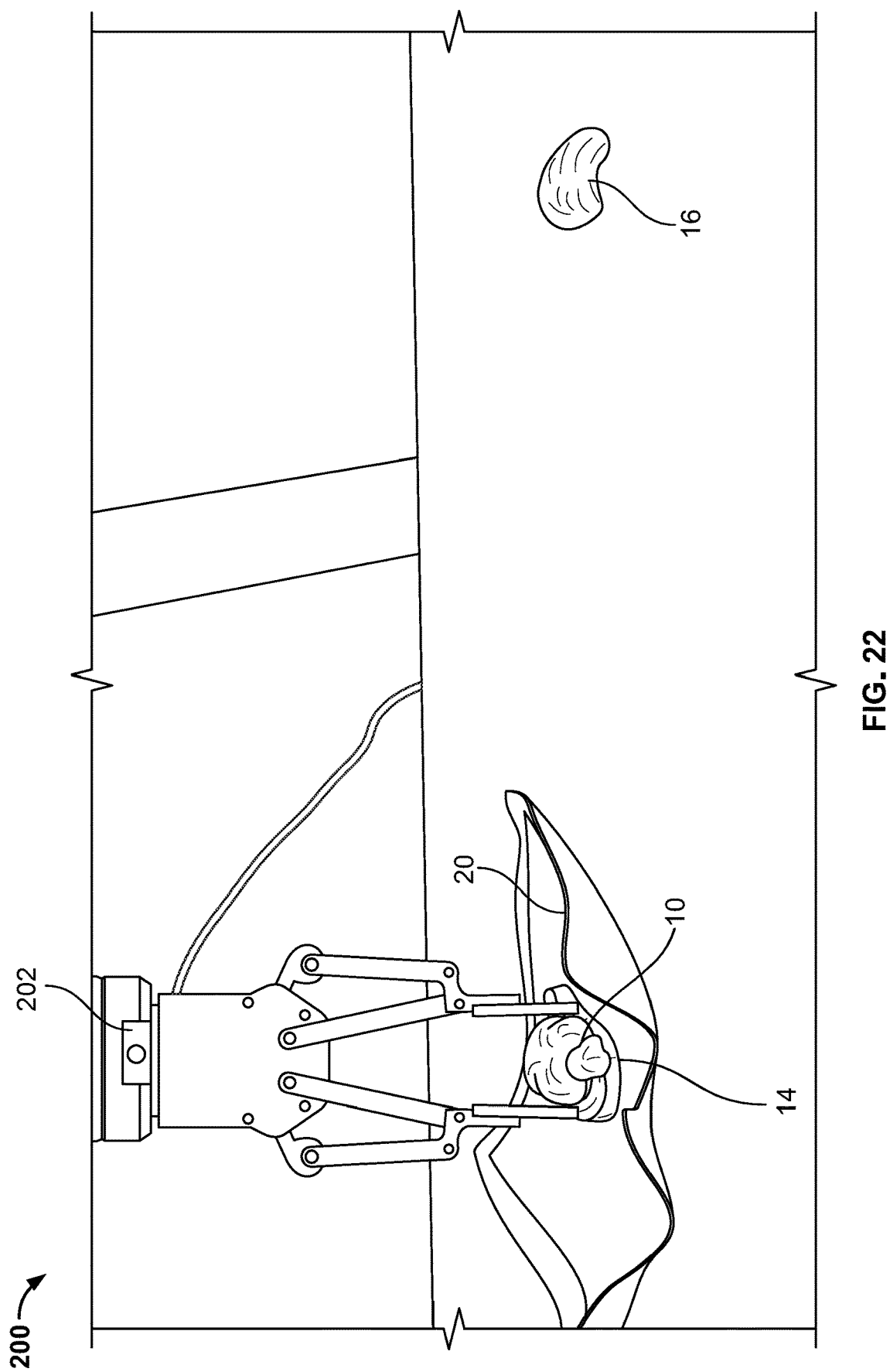
FIG. 22 depicts a perspective view of the system for preparing a food product of FIG. 18 during the process of preparing a food product.
Figure 23:
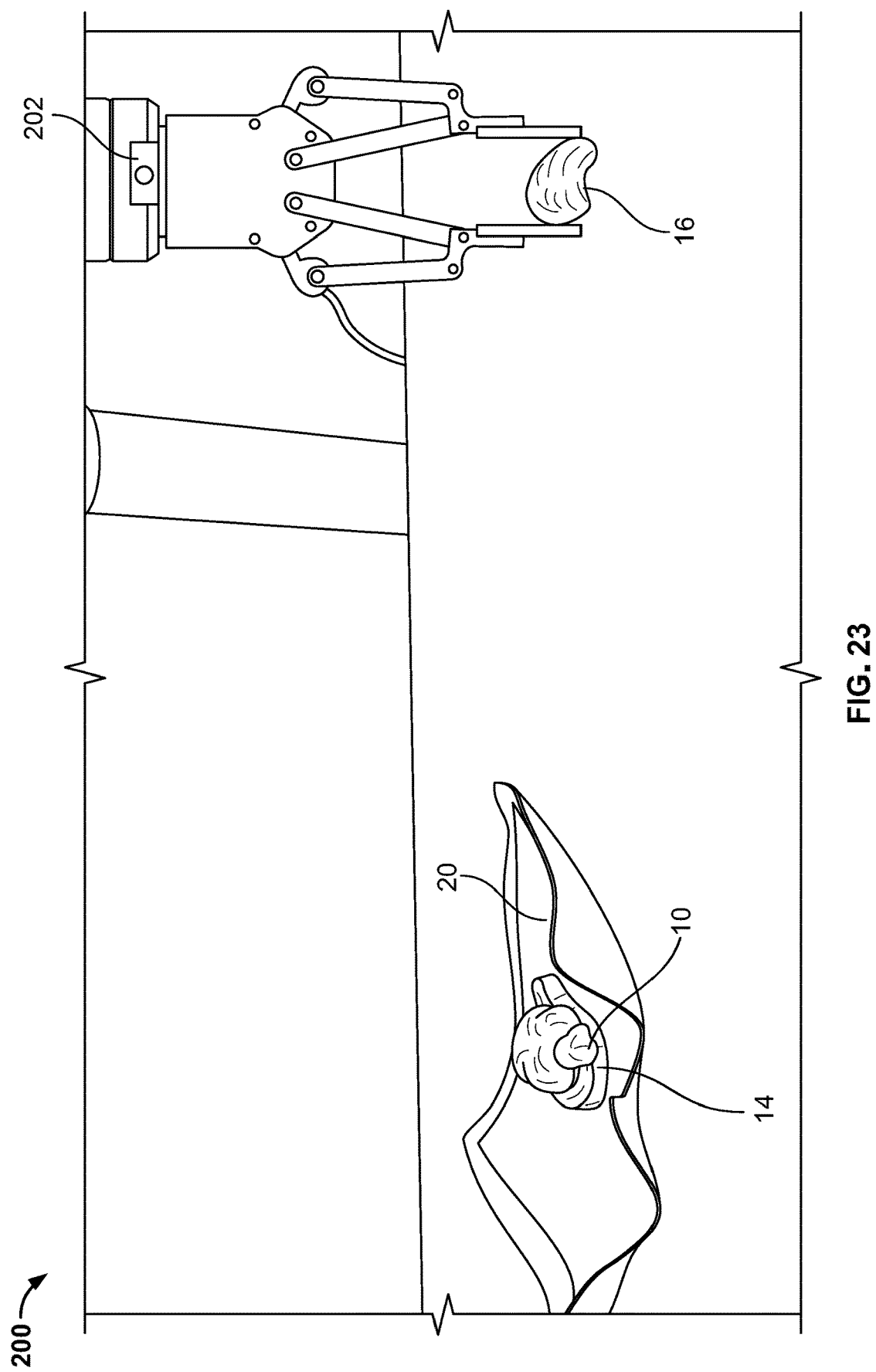
FIG. 23 depicts a perspective view of the system for preparing a food product of FIG. 18 during the process of preparing a food product.
Figure 24:
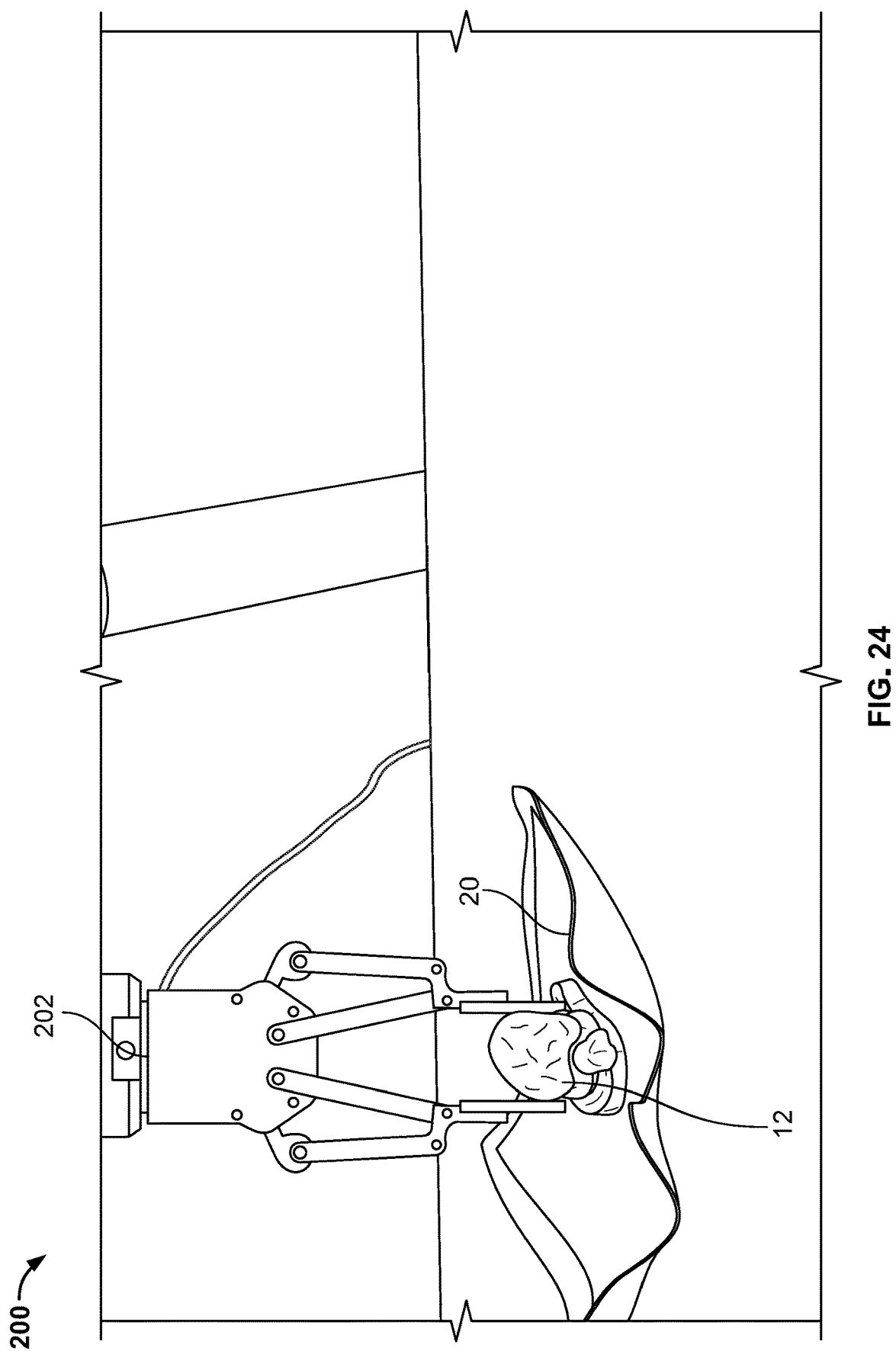
FIG. 24 depicts a perspective view of the system for preparing a food product of FIG. 18 during the process of preparing a food product.

The exemplary method using the system 100 may comprise the following steps:

a. The robotic arm 102 may grasp the first wire basket 104, which contains meat 10, such as, but not limited to, chicken. The robotic arm 102 may then dip and subsequently remove the wire basket 104 holding the meat into the solution contained in the first container 106. These steps are illustrated in FIGS. 2-5.

b. Next, the robotic arm 102 may move the first wire basket 104 above the second container 110 and then drop the meat 10 into the second container 110 as shown in FIGS. 6 and 7.

c. The robotic arm 102 may then grasp spatula 112 and stir the contents of the second container to ensure that the meat 10 is fully coated as shown in FIGS. 8 and 9.

d. After the meat 10 is coated with the dry coating, the robotic arm 102 may grasp a basket adapter, or handle, 114 that may connect to the second wire basket 108. After grasping the basket adapter 114, the robotic arm 102 may rotate the second wire basket 108 such that the opening of the wire basket 108 is substantially perpendicular to the opening of the second container 110. The arm 102 then lowers the second wire basket 108 into one side of the second container 110 and moves the second wire basket 108 along the second container 110 in a scooping motion to gather the meat 10 within the wire basket 108. These steps are shown in FIGS. 10-12. The handle 114, as shown in more detail in FIGS. 10A-10D, may allow the robotic arm 102 to grasp and manipulate the second wire basket 108, where wire basket 108 includes a pair of side handles 109 arranged at either end. The basket adapter 114 may comprise an elongated primary member 116 that extends along the length of the second wire basket 108 and underneath the side handles 109 positioned on each side of the basket 108. Elongated primary member 116 may have a first end 118 and a second end 120 opposite the first end 118 with a body member 122 extending between the first end 118 and the second end 120. The body member 122 may have a length within a range of 12 inches to 20 inches. The body member 122 may have a top surface 124, a bottom surface 126, and a recess 128 in the top surface 124. In some embodiments, the body member 122 may have a substantially planar top surface 124 where the handle 114 engages the side handles 109. For example, the body member 122 may have a substantially rectangular or a substantially square cross-sectional shape. For example, the body member may have a cross-sectional width of approximately 1.5 inches, or within a range of 1 inch and 2 inches, and a cross-sectional height of approximately 1 inch, or within a range of 0.5 inches and 1.5 inches. In some embodiments, the cross-sectional height may be sized to fit in the space between the bottom of the side handles 109 and the top surface of the basket 108. In other embodiments, the body member 122 may have any geometric shape such as a circular or elliptical cross-sectional shape. Recess 128 may be located in a central region 129 of the primary member 116 such that the regions near the ends 118, 120 have a thickness that is greater than a thickness of the central region 129.

e. Each end 118, 120 of the elongated member 116 may have a groove 130 in the top surface 124 to engage the side handles 109 of basket 108. The grooves may be located near each end 118, 120 or within an inch from the respective end 118, 120. The grooves 130 may releasably engage the side handles 109 of the wire basket 108. In addition, the grooves 130 may has an undercut geometry such that each grooves 130 has a width at a bottom surface 134 of the groove 130 that is larger than a width at the opening at top end 136 of the groove 130. This undercut allows the groove 130 to be secured to the side handles 109 of the basket 108 with a snap-fit connection. In some embodiments, this undercut region may extend the entire length of the groove, while in other embodiments, the undercut region may occur in portions or discrete locations along the groove. For example, the groove 130 may only have narrower upper portion at one end of the groove 130 to allow the basket adapter to rotate relative to the basket 108 while being attached to the basket 108. Furthermore, each groove 130 may have a width at the bottom surface 134 that is wider than the wire diameter of the side handle 109 to allow the basket adapter 114 to slide along the side handles 109. In some instances, the width of the opening at the top end 136 may be within a range of 0.15 inches and 0.25 inches, while the width of the bottom surface 134 may be within a range of 0.25 inches and 0.35 inches. A ratio may be used to express the relationship between the width at the bottom surface and the width at the opening at the top end 136, where the ratio of the width at the bottom surface and the width at the opening at the top end 136 may be approximately 1.5:1, or within a range of 1.25:1 and 2:1. Also, in the exemplary embodiment, each groove 130 may have a planar bottom surface 134, while in other embodiments, each groove 130 may have a curved bottom surface to promote the basket adapter 114 to rotatably engage the wire basket 108 as shown in FIG. 10F. The depth of the each groove 130, when having a planar bottom surface 134, may be within a range of 0.2 inches and 0.3 inches. Alternatively, the basket adapter 114 may releasably engage the basket 108 in using a mechanical mechanism such as a clip or flange that wraps around the wire side handles 109.

f. A protrusion 132 may extend from the central region 129 of the elongated member 116. The protrusion 132 may extend in a manner to form an acute angle with the top surface 124 of the elongated member 116. For example, the acute angle may be approximately 40 degrees, or at an angle between 25 degrees and 55 degrees. In some embodiments, the protrusion 132 may be pivotally attached to the elongated member 116 such that the angle between the protrusion 132 and elongated member 116 is adjustable so it can be set to best suit a particular robotic arm 102 as shown in FIG. 10E. The protrusion 132 may have a length within a range of 3 inches to 6 inches to provide an adequate grasping region. The protrusion 132 may have a substantially rectangular or square cross-sectional shape, or have at least two flat sides, or planar surfaces, to allow the clamp portion of the robotic arm 102 to easily grasp the protrusion 132. The planar surfaces may be positioned opposite each other. The handle 114 may move and rotate relative to the second wire basket 108 in order to provide additional range of movement. The basket adapter 114 may be formed from a polymeric or metallic material and may be formed by an injection molding process or other process known to one skilled in the art such as casting or machining.

g. Next, the robotic arm 102 may remove the basket 108 from the second container 110 and rotate it such that the opening of the basket 108 is substantially parallel to the opening of the second container. In a shaking motion, the robotic arm 102 may shake off any of the excess dry coating as shown in FIGS. 13 and 14.

h. As an option, the meat 10 may go through this process multiple times such that the process steps of (a.) through (h.) may be repeated. If the process needs to be repeated, the robotic arm 102 may move and then rotate the second wire basket 108 to dispense the meat into the first wire basket 104 to have an additional coating applied as illustrated in FIG. 15.

i. Once the meat 10 has been adequately coated, the robotic arm 102 may place the second basket having the coated meat onto a flat surface and remove the meat or individually remove each of the plurality of meats from the second basket 108 and place them on a tray 131 to have allow them to be cooked as illustrated in FIGS. 16 and 17.

FIGS. 18-39 illustrate system 200 for assembling a food product, such as a sandwich 12, using the robotic arm 202 and then wrapping the sandwich 12 within a wrapper. The system 200 comprises the robotic arm 202, which may be the same robotic arm 102 used for system 100, a wrapping assist device 204, and a wrapping surface 203 to wrap a sandwich 12 in a flat wrapper 20.

Figure 25:
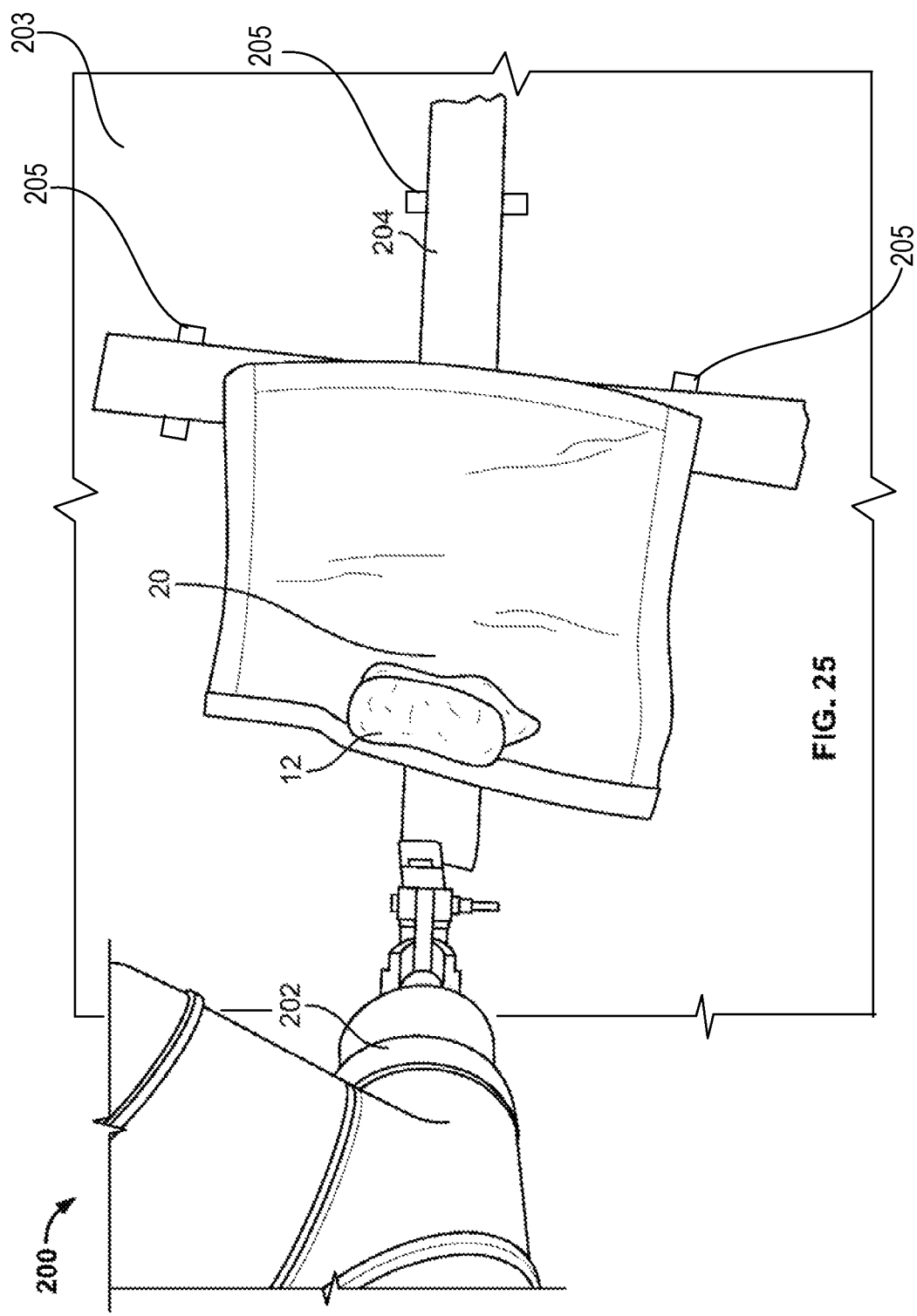
FIG. 25 depicts a perspective view of the system for preparing a food product of FIG. 18 during the process of preparing a food product.
Figure 26:
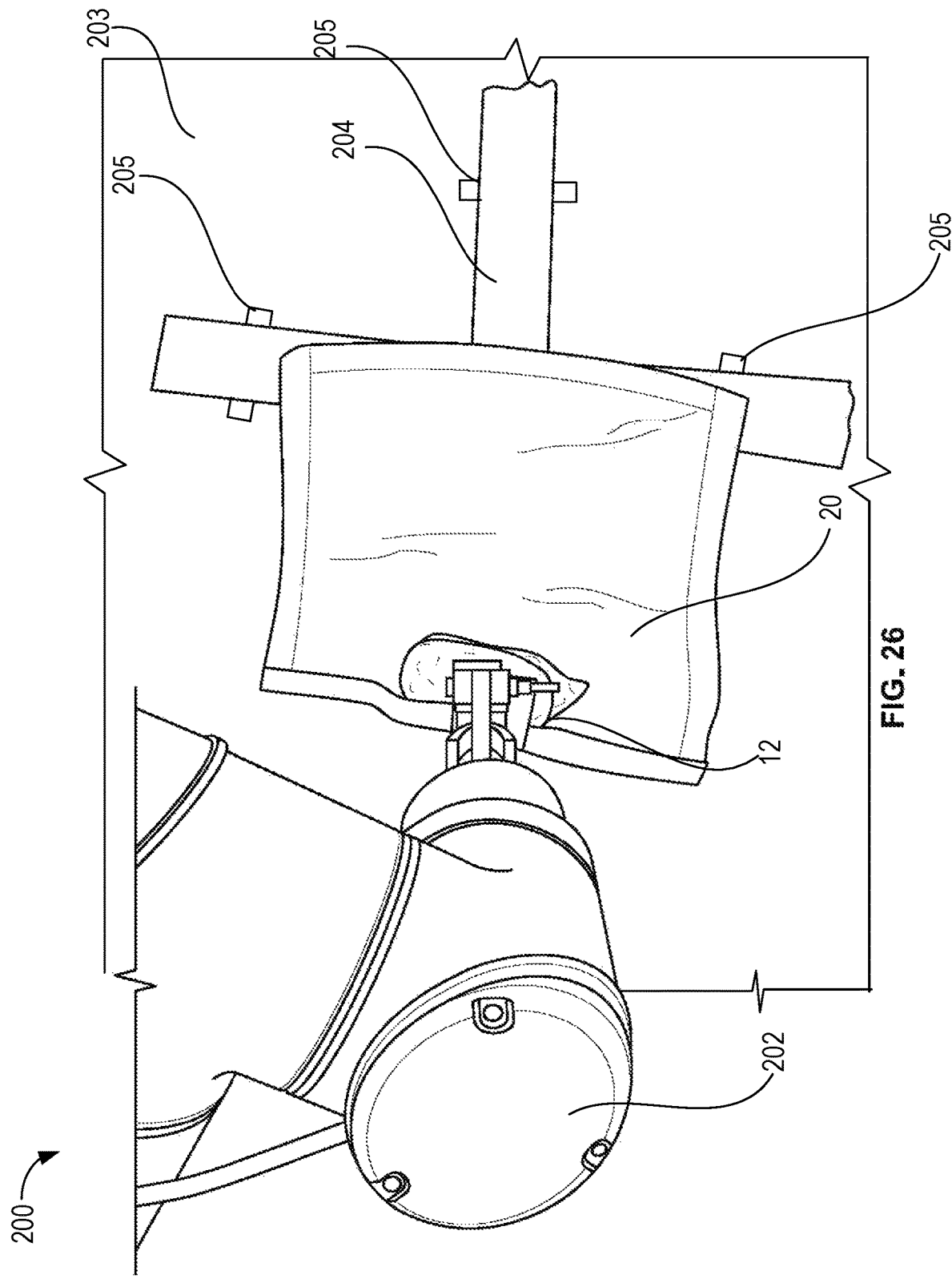
FIG. 26 depicts a perspective view of the system for preparing a food product of FIG. 18 during the process of preparing a food product.
Figure 27:
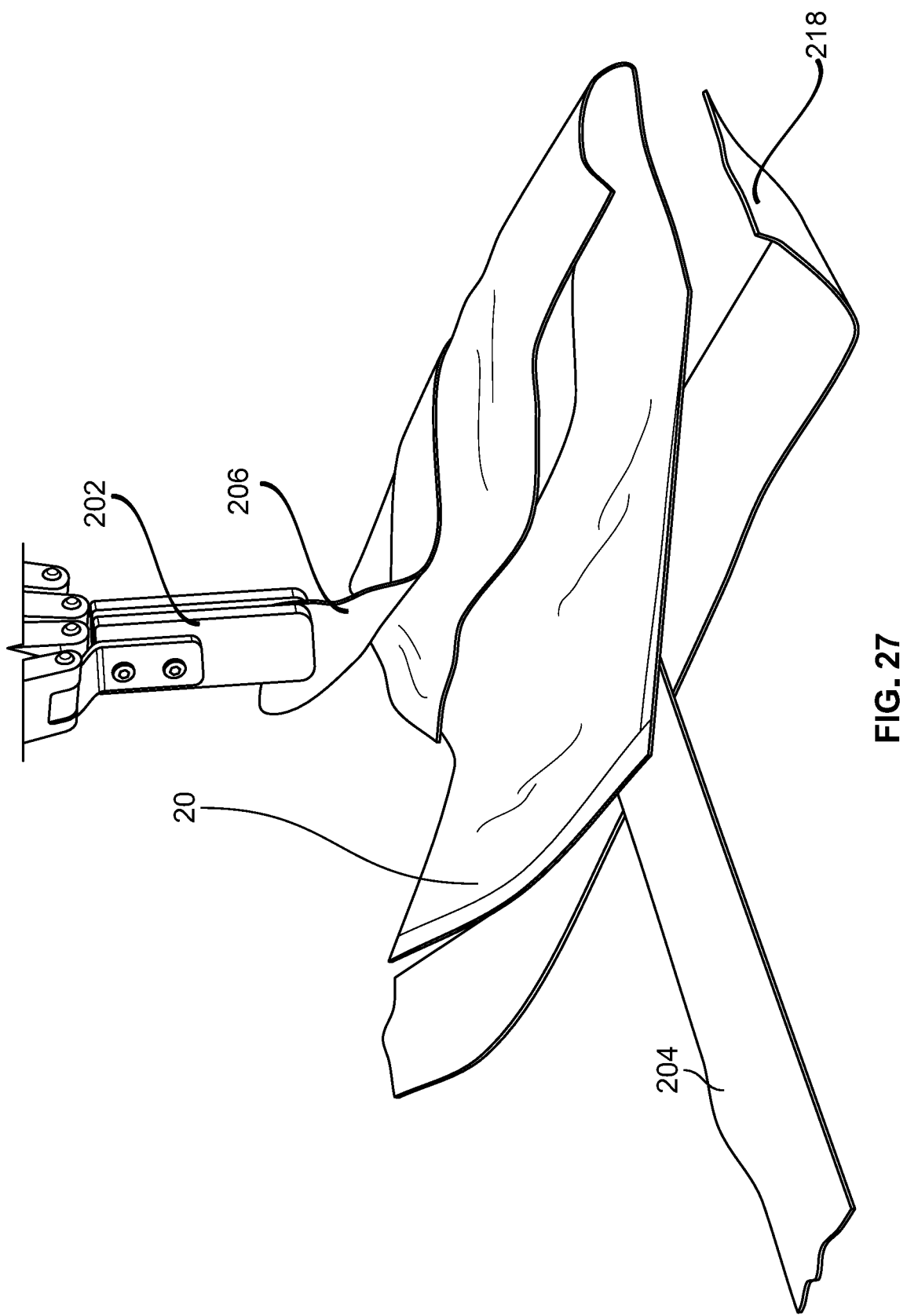
FIG. 27 depicts a perspective view of the system for preparing a food product of FIG. 18 during the process of preparing a food product with the wrapping surface removed for clarity.
Figure 28:
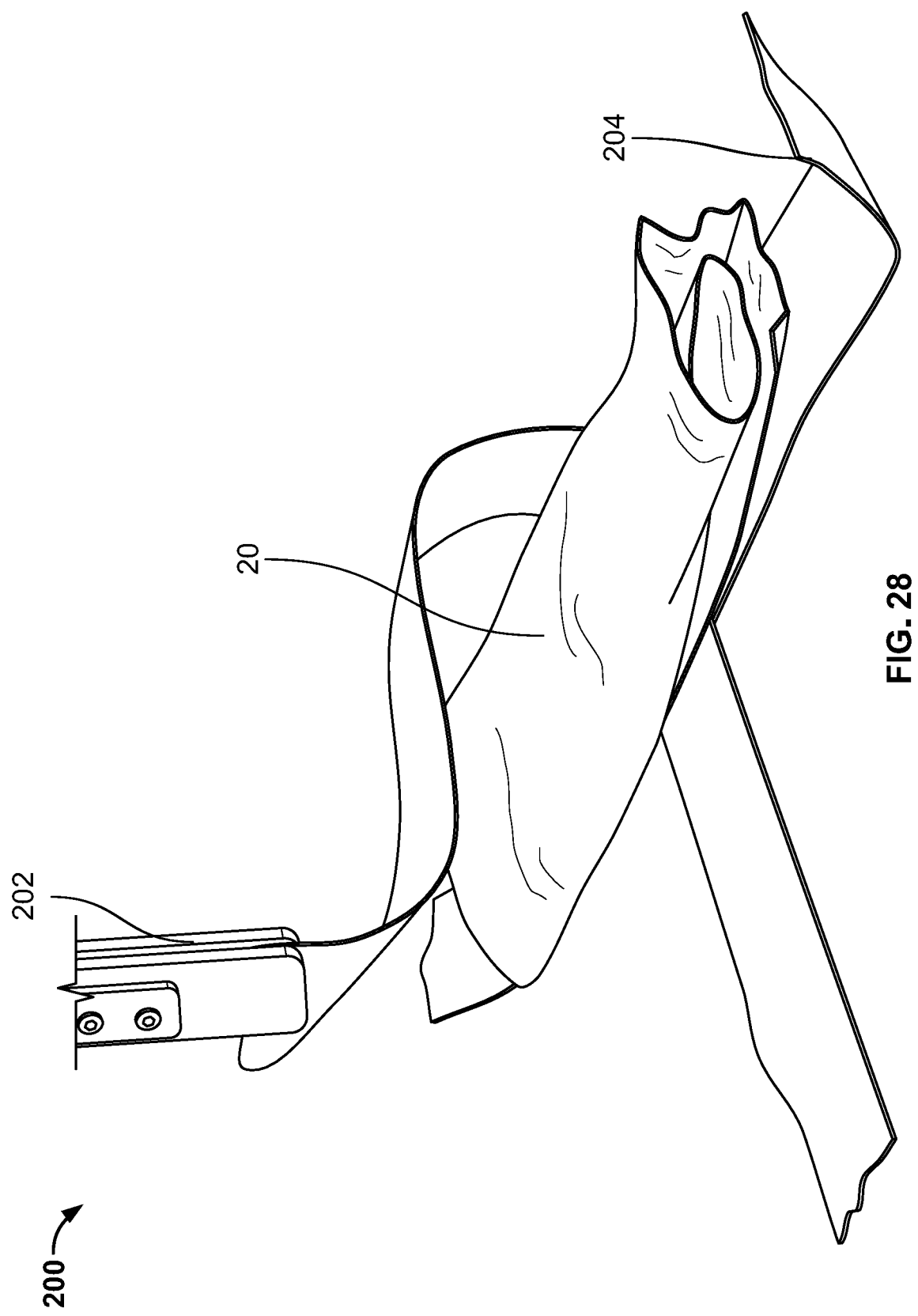
FIG. 28 depicts a perspective view of the system for preparing a food product of FIG. 18 during the process of preparing a food product with the wrapping surface removed for clarity.
Figure 29:
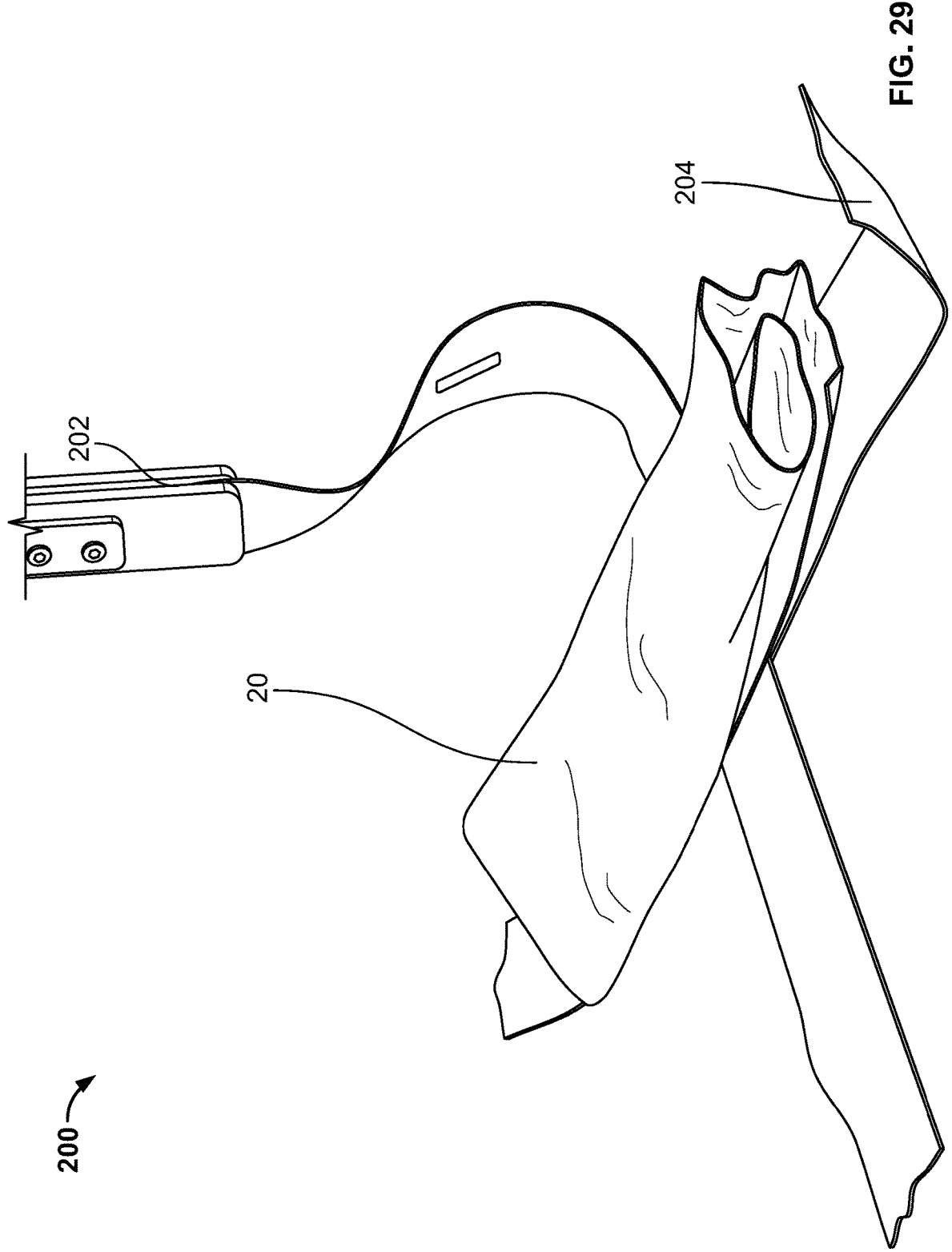
FIG. 29 depicts a perspective view of the system for preparing a food product of FIG. 18 during the process of preparing a food product with the wrapping surface removed for clarity.
Figure 30:
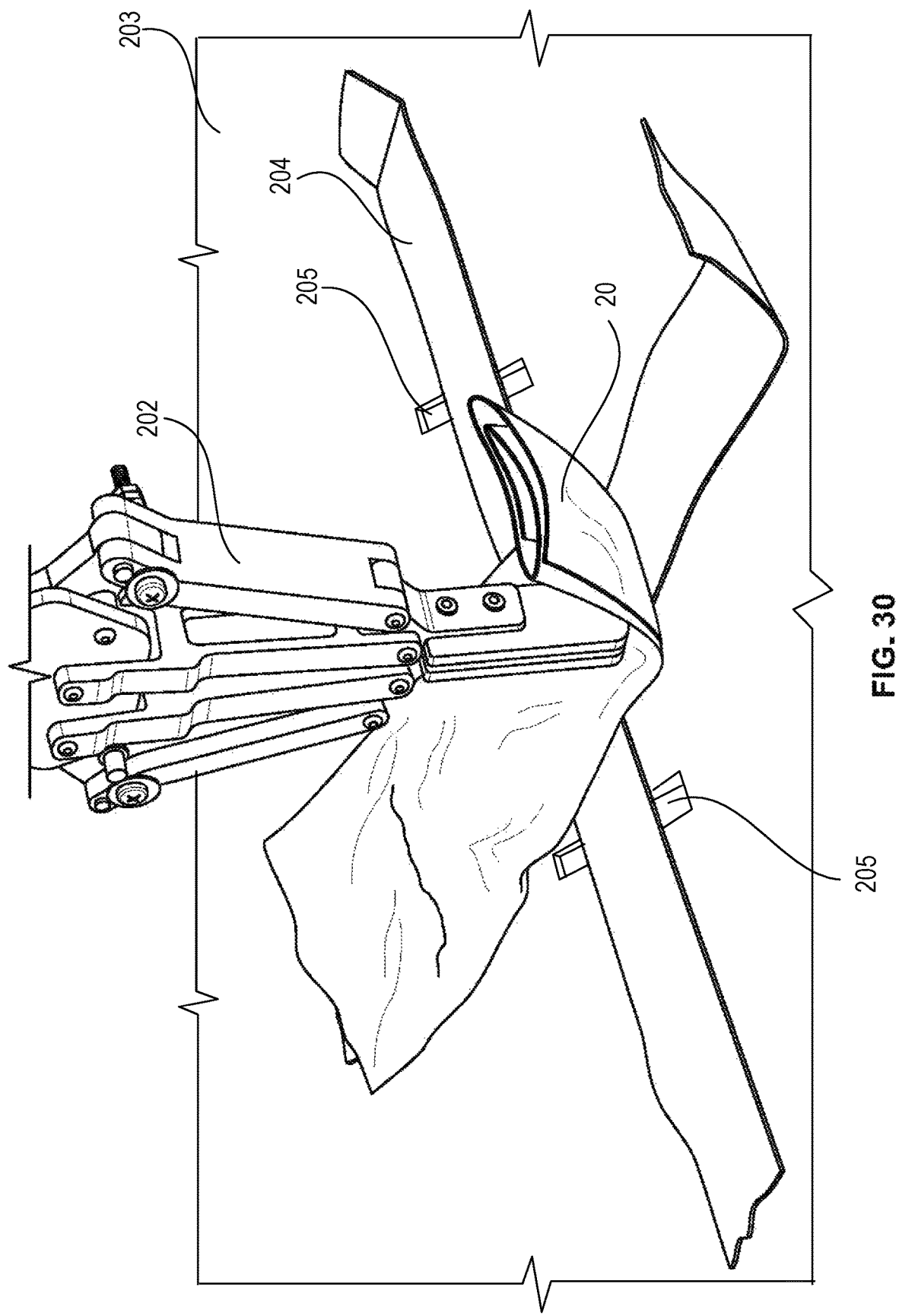
FIG. 30 depicts a perspective view of the system for preparing a food product of FIG. 18 during the process of preparing a food product.
Figure 31:
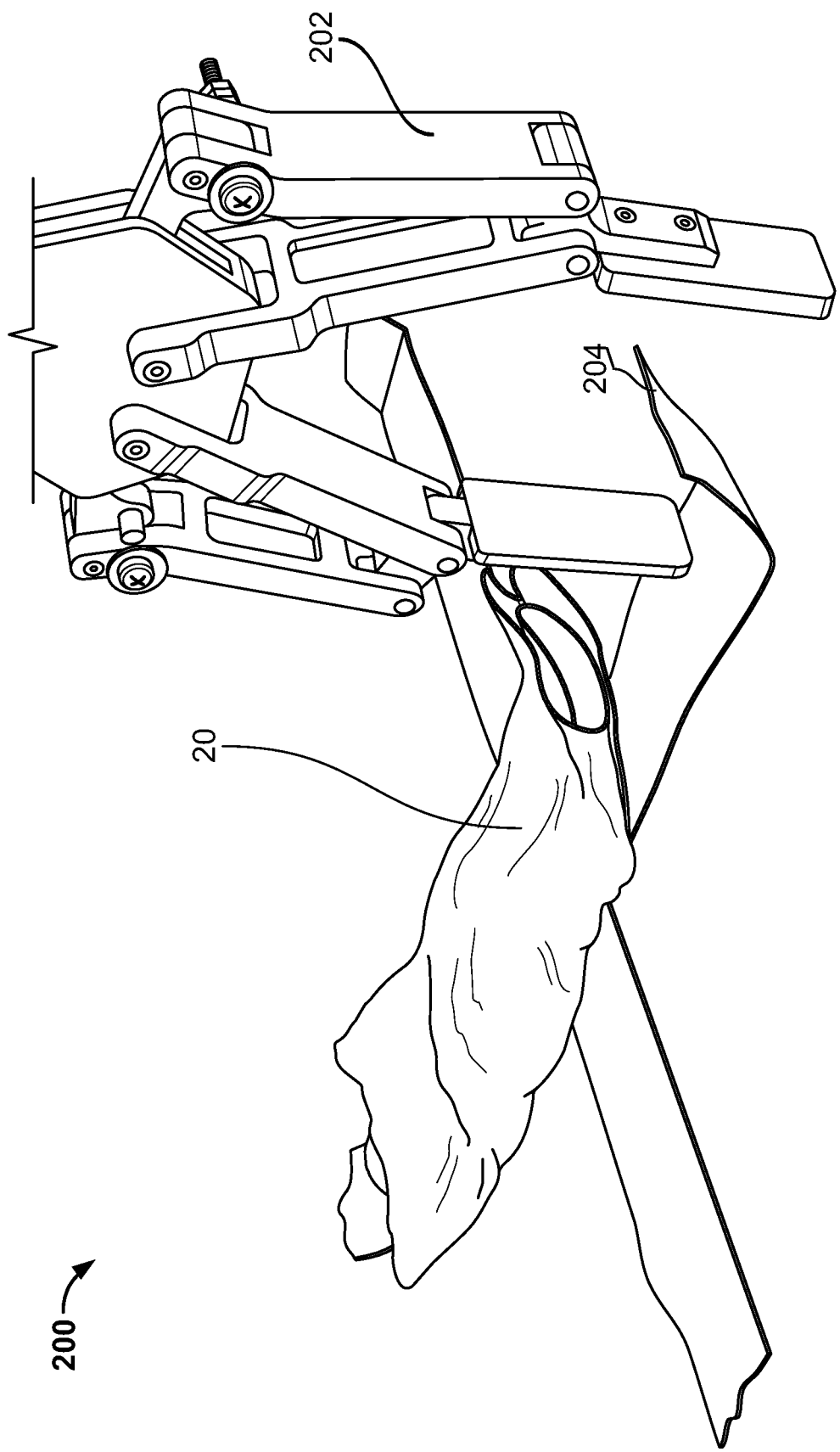
FIG. 31 depicts a perspective view of the system for preparing a food product of FIG. 18 during the process of preparing a food product with the wrapping surface removed for clarity.
Figure 32:
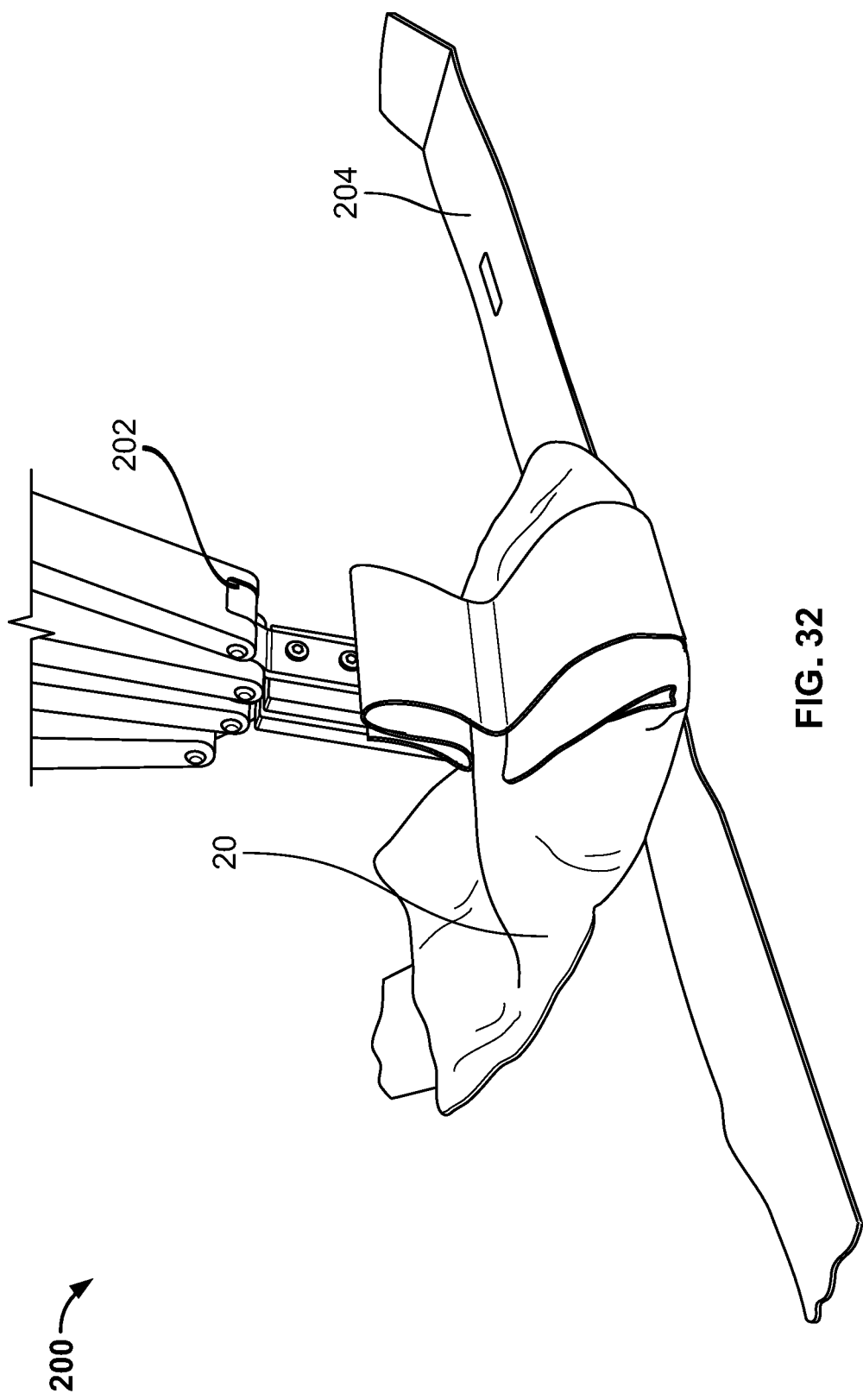
FIG. 32 depicts a perspective view of the system for preparing a food product of FIG. 18 during the process of preparing a food product with the wrapping surface removed for clarity.
Figure 33:
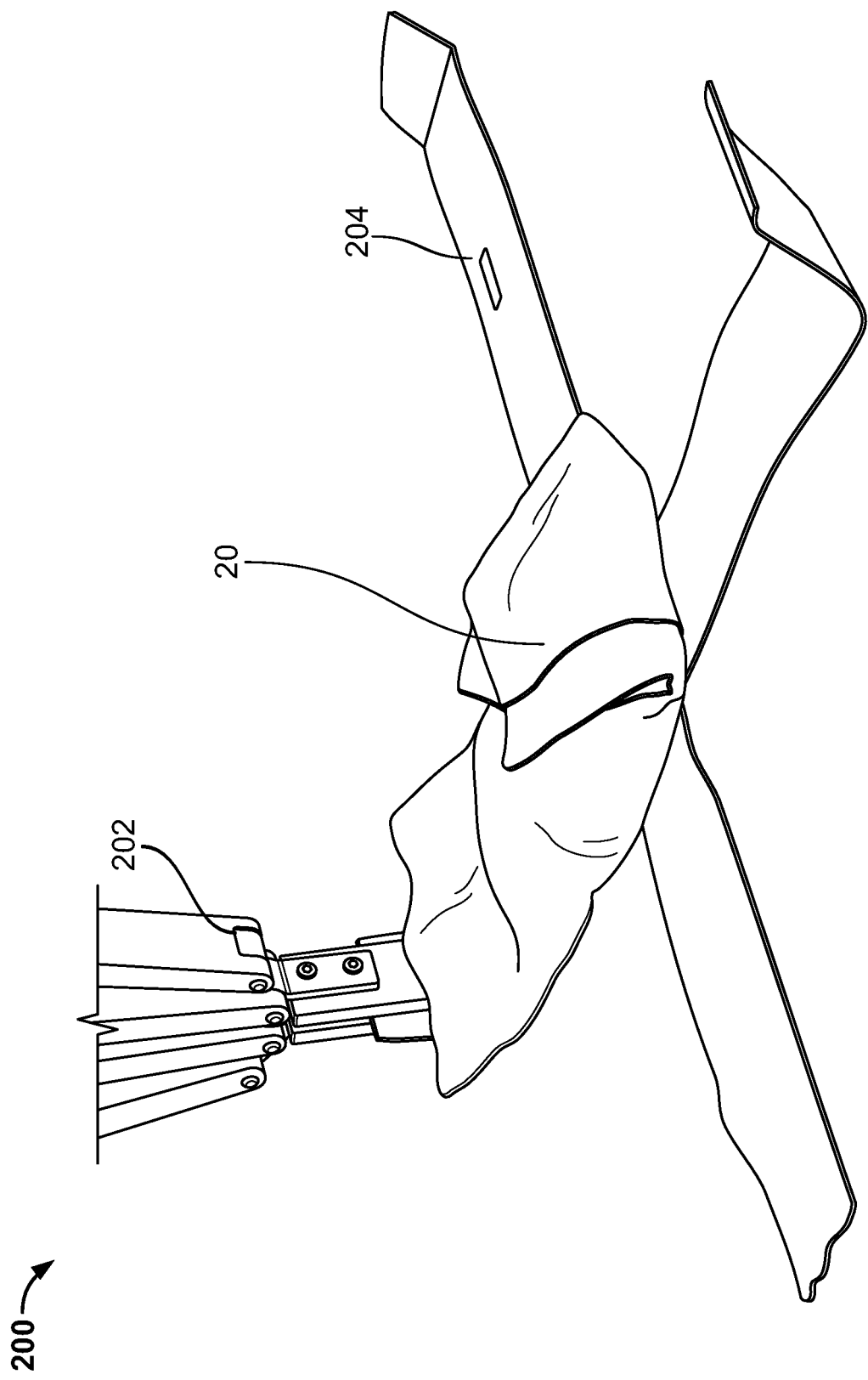
FIG. 33 depicts a perspective view of the system for preparing a food product of FIG. 18 during the process of preparing a food product with the wrapping surface removed for clarity.
Figure 34:
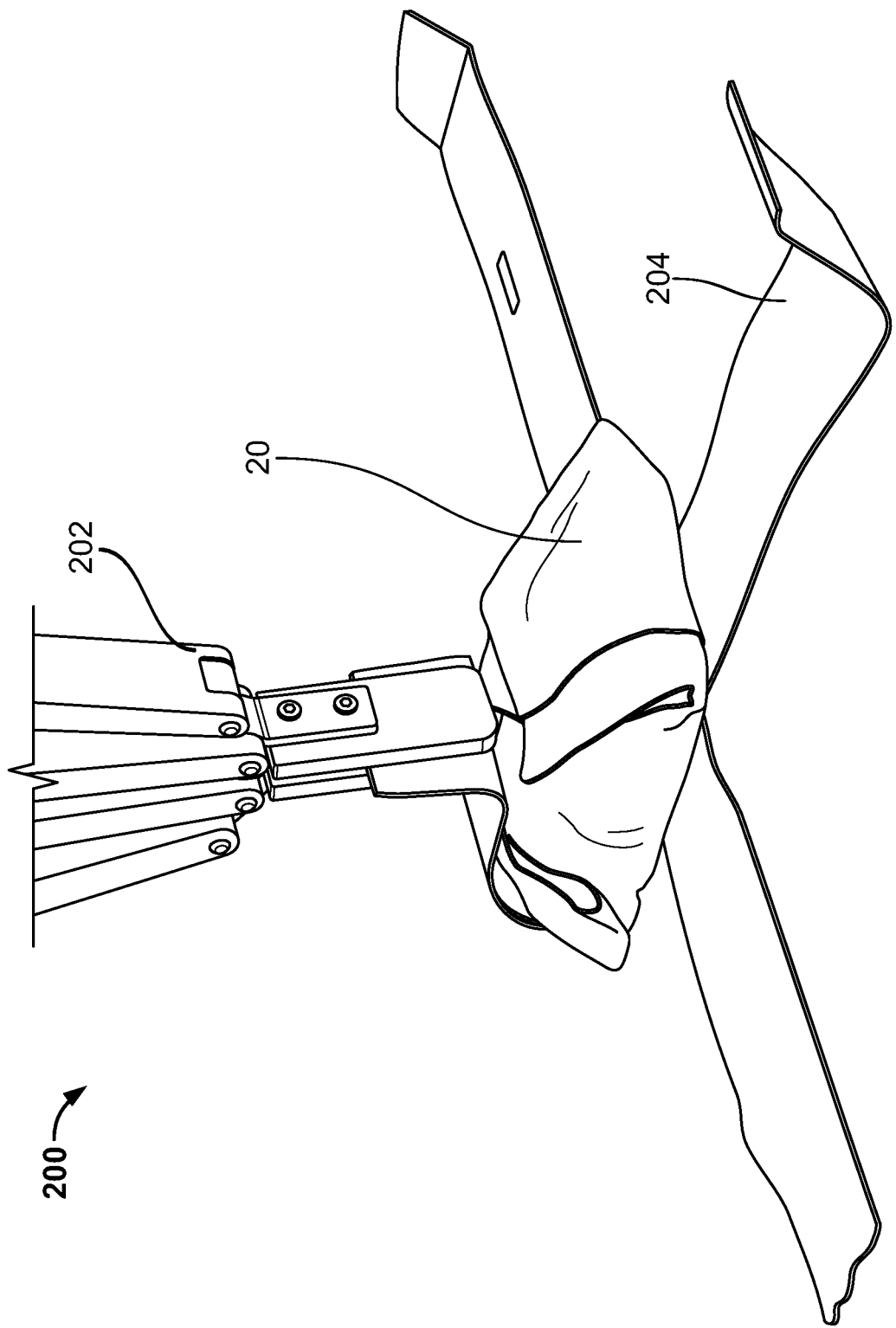
FIG. 34 depicts a perspective view of the system for preparing a food product of FIG. 18 during the process of preparing a food product with the wrapping surface removed for clarity.
Figure 35:
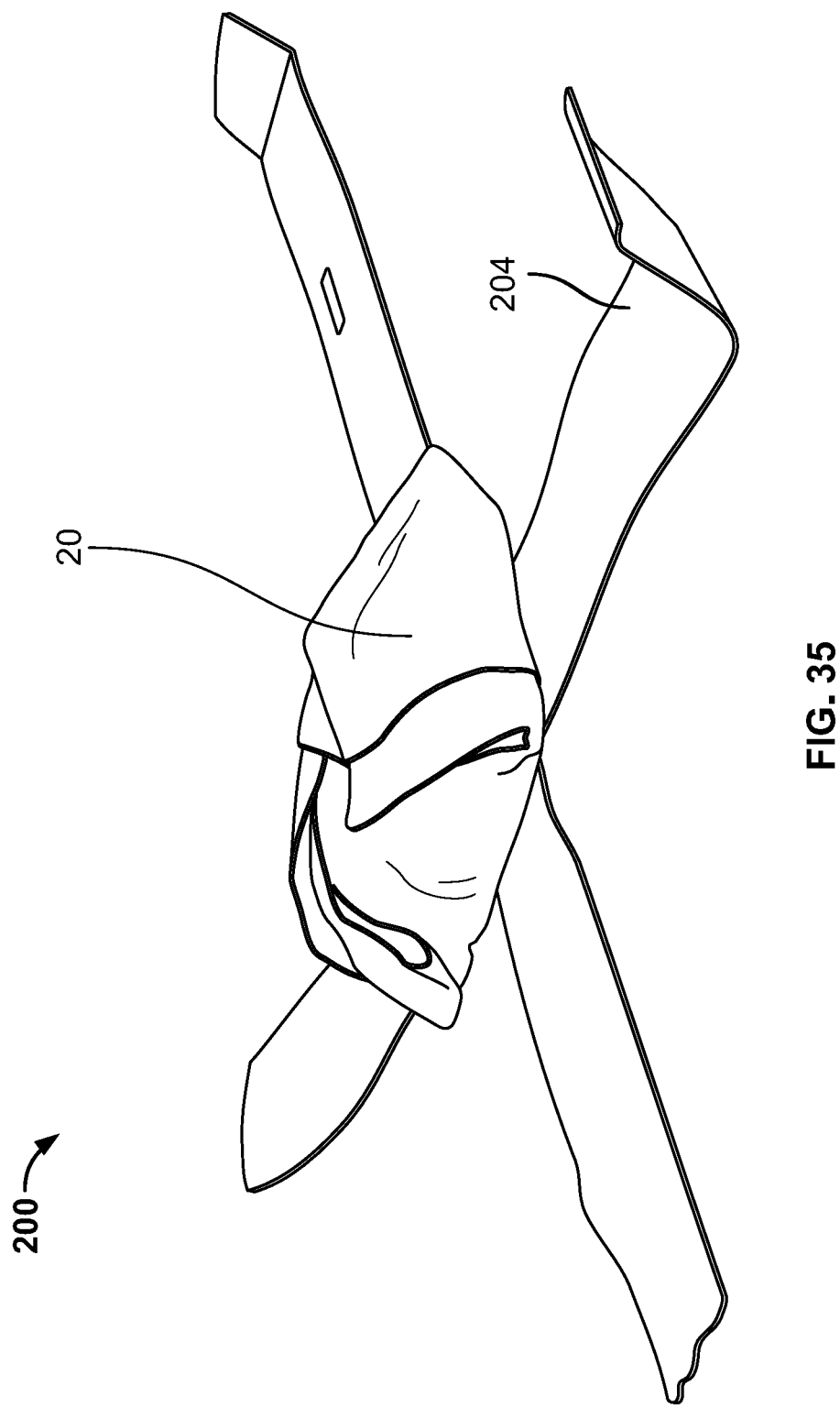
FIG. 35 depicts a perspective view of the system for preparing a food product of FIG. 18 during the process of preparing a food product with the wrapping surface removed for clarity.
Figure 36:
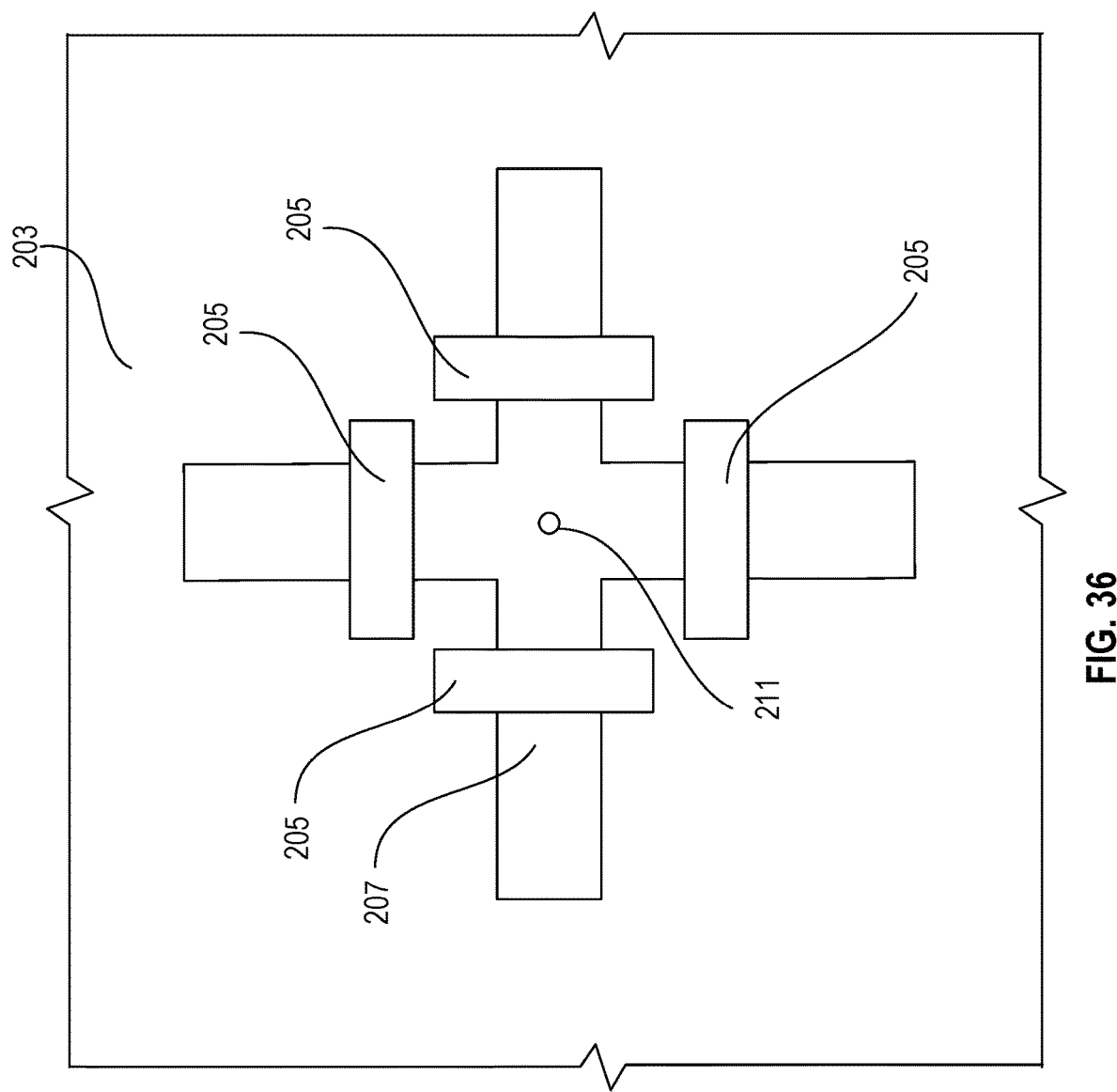
FIG. 36 depicts a top view of the wrapping surface of the system for preparing a food product of FIG. 18 during the process of preparing a food product.
Figure 37:
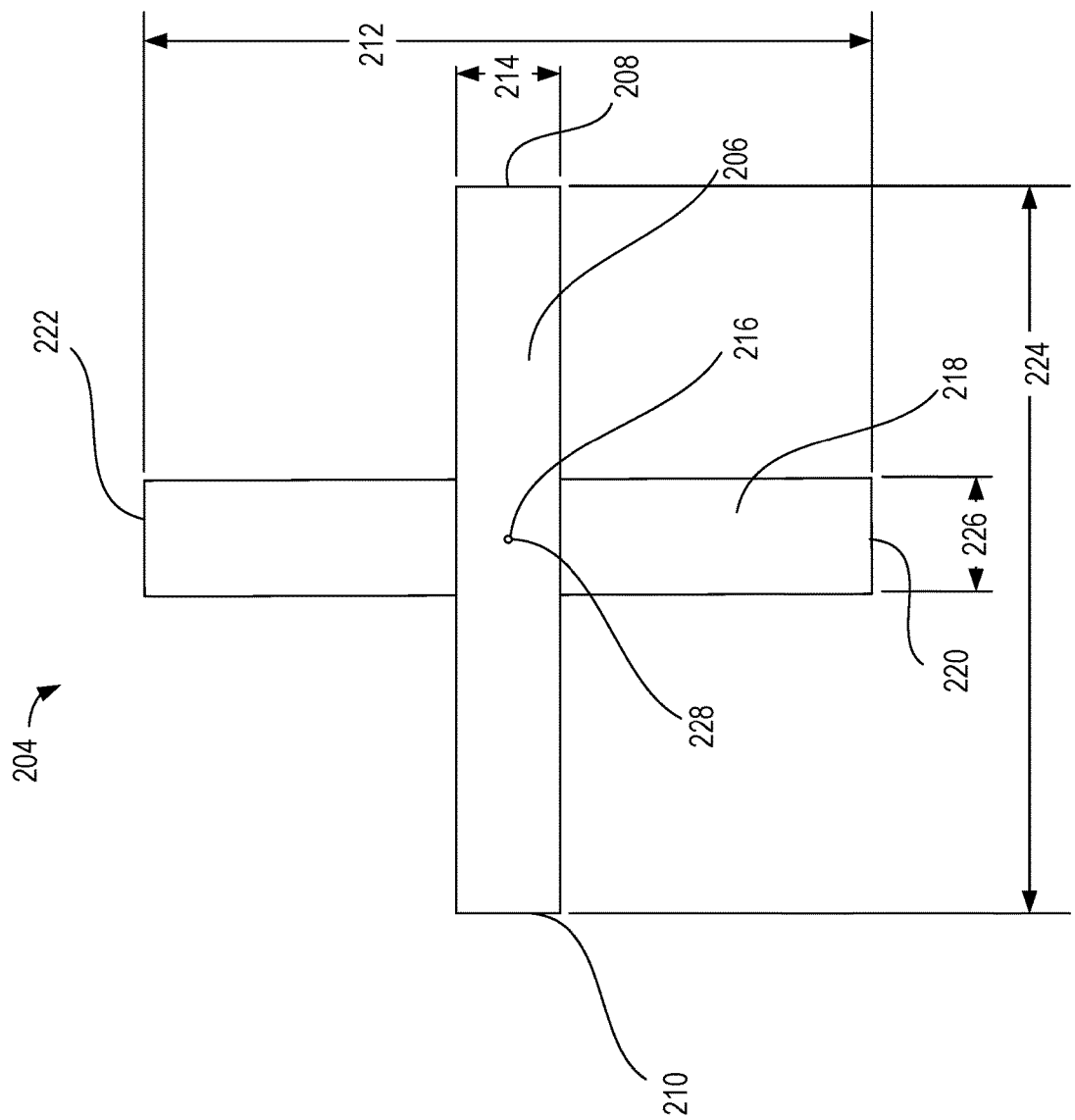
FIG. 37 depicts a top view of the wrapping assist device of the system for preparing a food product of FIG. 18 during the process of preparing a food product.
Figure 38:
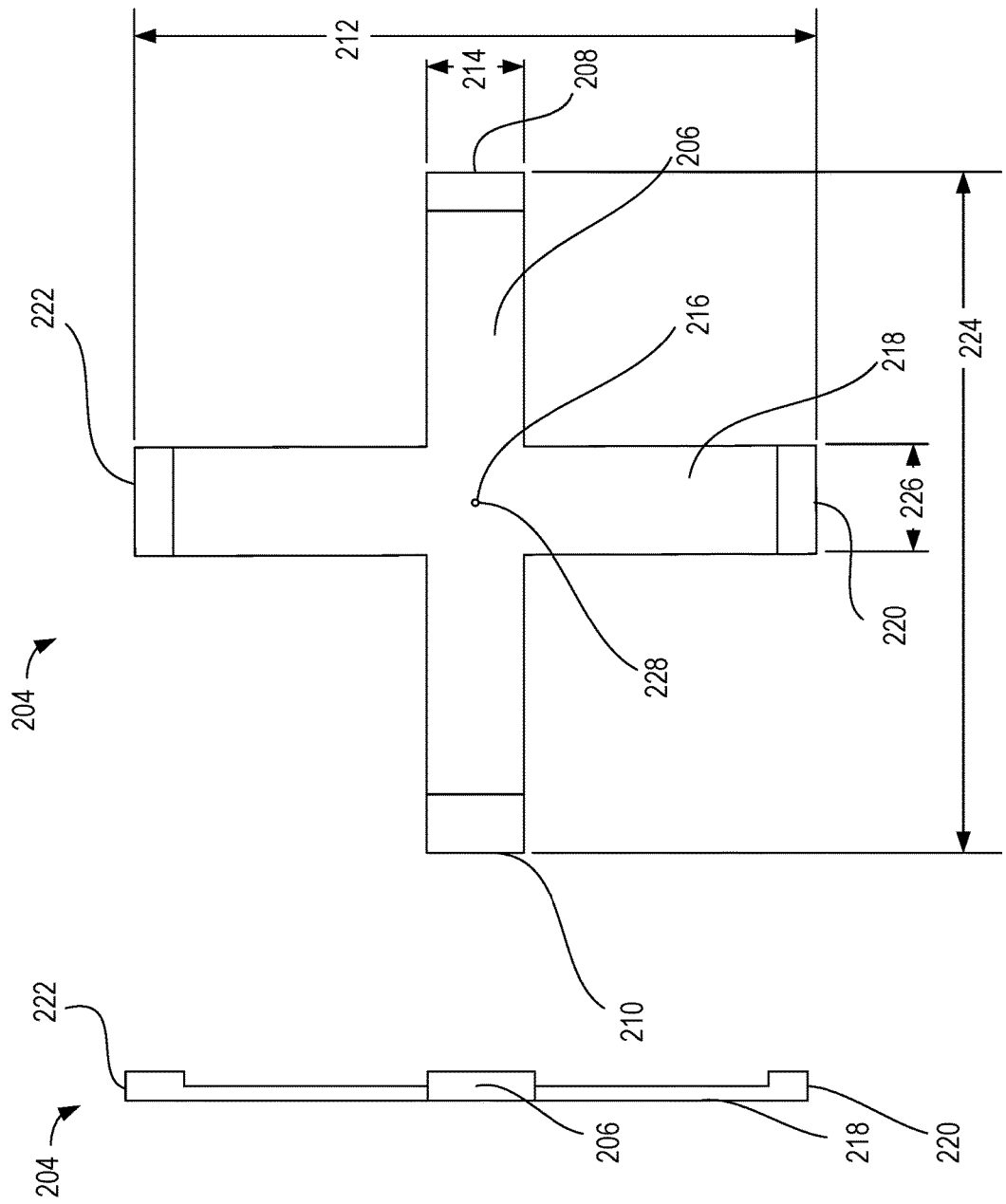
FIG. 38 depicts a top view of an alternate wrapping assist device of the system for preparing a food product of FIG. 18 during the process of preparing a food product.
Figure 39:
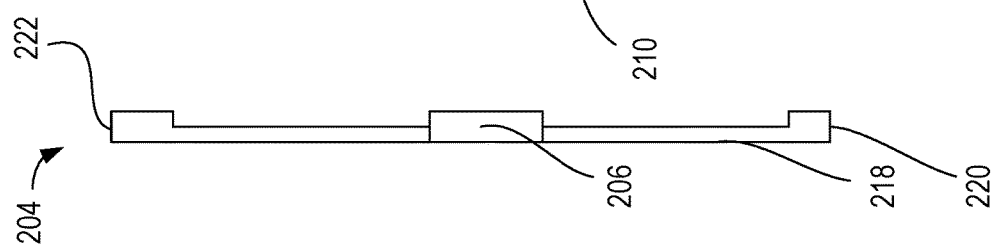
FIG. 39 depicts a side view of the wrapping assist device of FIG. 38.

The exemplary method using the system 200 may comprise the following steps:

a. First, the robotic arm 202 may assemble the sandwich 12 onto a wrapper 20, wherein the sandwich 12 is comprised of a bottom bun 14, the meat 10, which could be prepared at least partially using system 100 described above, and the top bun 16. The sandwich 12 is assembled by the robotic arm 202 placing the bottom bun 14 first, then the meat 10, and then placing the top bun 16 on top of the meat 10 as illustrated in FIGS. 18 through 24. Once the sandwich 12 is assembled onto the wrapper 20, the robotic arm 202 may wrap the wrapper 20 around the sandwich 12.

b. To wrap the wrapper 20 around the sandwich 12, the wrapper 20 holding the sandwich 12 may be placed on top of a wrapping assist device 204 as illustrated in FIG. 25. The wrapping assist device 204 may be placed on wrapping surface 203. The wrapping assist device 204 may be comprised of two strap-like elements 206, 218 that may be equal lengths and oriented perpendicular to each other such that the two straps cross each other at each of their corresponding midpoints. The first strap 206 may have a first end 208, a second end 210, a first strap length 212, a first strap width 214, and a first strap center point 216 positioned at a midpoint of the first length 212 and a midpoint of the first strap width 214. Similarly, the second strap 218 having a first end 220, a second end 222, a second strap length 224, a second strap width 226, and a second strap center point 228 positioned at a midpoint of the second strap length 224 and a midpoint of the second strap width 226. As discussed above, the first strap 206 and the second strap 218 may extend substantially perpendicular to each other and may be arranged such that the first strap center point 216 and the second strap center point 228 may be substantially aligned. The first strap length 212 and the second strap length 224 may be sized to accommodate different sized wrappers such that the lengths 212, 224 extend approximately 3 inches beyond the extents of the wrapper 20 on each side. For example, if the wrapper 20 is 12 inches wide by 12 inches long, each strap 206, 218 may be approximately 18 inches long. In the exemplary embodiment, the first strap length 212 and the second strap length 224 have the same length to accommodate wrappers 20 that have a square shape, while in other embodiments the first strap length 212 and the second strap length 224 may have different lengths to accommodate wrappers 20 that may have a rectangular shape or asymmetrical shape. In the exemplary embodiment, the first strap width 214 may be the same width as the second strap width 226, while in other embodiments, the first strap width 214 may be a different width as the second strap width 226. The first end 208 of the first strap 206 and the second end 210 of the first strap 206 may have a thickness that is larger than a thickness of the first strap 206 at the first strap center point 216, as shown in FIG. 39. Similarly, the first end 220 of the second strap 218 and the second end 222 of the second strap 218 may have a thickness that is larger than a thickness of the second strap 218 at the second strap center point 228. As another option, the ends 208, 210 of strap 206 and ends 220, 222 of strap 218 may be angled upward to assist the robotic arm 202 in grasping the ends.

c. In the exemplary embodiment, the first strap 206 and the second strap 218 may be formed separately and may be identical members. In other embodiments, the two straps 206, 218 may be formed as a unitary member, as shown in FIGS. 38 and 39. The straps 206, 218 may be formed from an elastomeric material, a polymeric material, a reinforced paper-type product, or other suitable material known to one skilled in the art. In some embodiments, the straps 206, 218 may be formed from a polymer or elastomer that is filled with a second material that has a higher density than the density of the polymer or elastomer to increase the weight of the straps 206, 218. The higher density material may be evenly spaced throughout the straps 206, 218 or may be locally positioned near the center points 216, 228 and/or positioned near the ends of the respective straps. The added weight helps the wrapping assist device 204 maintain its position and pressure on the wrapper when released over the wrapper by the robotic arm 102. For example, the wrapping assist device 204 may have a weight between 0.10 pounds and 0.50 pounds, or within a range of 0.10 pounds and 1.5 pounds. Alternatively, the wrapping assist device 204 may be formed from rigid sections attached with hinges that can fold inward on top of the wrapper 20.

d. As discussed above, the wrapping assist device 204 looks like a "+" sign. The wrapper 20 holding the sandwich 12 may be placed on one side the one of the straps 206, 218 such that the sandwich 12 is biased to one side of the wrapper 20 and the wrapper 20 extends approximately on half the length of one of the straps 206, 218 and the edge of the wrapper 20 may be placed where the two straps 206, 218 cross each other. The wrapper 20 may be positioned in the appropriate position on top of the wrapping assist device 204 during the sandwich assembly process described above.

e. To begin the wrapping process, the robotic arm 202 may grasp an edge of one end of one of the straps 206, 218 of the device 204 closest to the sandwich 12 and pull the chosen strap over the sandwich 12. The wrapping assist device 204 may be releasably connected to the wrapping surface 203 such that the first strap 206 and the second strap 218 are releasably connected to the wrapping surface 203 at the first strap center point 216 and the second strap center point 228. The releasable connection may use an adhesive on one side or a mechanical connection, such as a fastener, or clip that secures the center points 216, 228 to the wrapping surface 203. As the chosen strap is moved, the wrapper 20 and the sandwich 12 may be rotated such that the wrapper 20 and sandwich 12 are rolled together until the sandwich 12 is positioned in the center of the two crossing straps 206, 218 as illustrated in FIGS. 26-28. The arm 202 then releases the strap as shown in FIG. 29.

f. Next, the robotic arm 202 may tap on the wrapper 20 on either side of the sandwich 12 to put a crease into the wrapper 20 to make the wrapper easier to fold as illustrated in FIG. 30. The wrapper 20 may be a flat rectangular or square shaped wrapper. The wrapping surface 203 may have at least one recess 205 positioned underneath a portion of each of the straps 206, 218 to allow the robotic arm 202 to extend beneath the wrapping surface 203 to allow the robotic arm 202 to make a more definitive crease in the wrapper 20. The recess 205 may be spaced a predetermined distance from the center points 216, 228 of the straps 206, 218. The predetermined distance may be approximately 3 inches from the center points 216, 228, or within a range of 2 inches and 6 inches from the center points 216, 228. Each recess 205 may have a generally rectangular shape with a width that is greater than its length, where the width of the recess may be greater than a width of the strap 206, 218 such that the strap 206, 218 that may extend over the recess 205. In some embodiments, the wrapping surface 203 may have at least two recesses 205 positioned under a portion of each of the straps 206, 218. The recess 205 may have a depth of at least an inch to allow the robotic arm 202 to extend into the recess to easily crease or fold the wrapper 20, or in some embodiments, the recess 205 may be an opening through the wrapping surface 203. In other embodiments, as shown in FIG. 36, the wrapping surface 203 may have a substantially X-shaped recess 207 or groove that generally matches the shape of the wrapping assist device 204 and receives the wrapping assist device 204. The X-shaped recess 207 may have a depth that is equal to or greater than the thickness of the straps 206, 218 such that when the wrapping assist device 204 is in the X-shaped recess 207, the majority of the top surface of the wrapping assist device 204 may be at or below the wrapping surface 203. The X-shaped recess 207 may also have an opening 211 at the center point of the recess 207 to assist in attaching the wrapping assist device 204. The X-shaped recess 207 may help to keep the wrapping assist device 204 properly located on the wrapping surface 203.

g. To complete the wrapped sandwich, the robotic arm 202 may grasp a first end 220 of the second strap portion 218 of the wrapping assist device 204 and pull it over the sandwich 12, which in turn pulls the wrapper 20 over the sandwich 12. Lastly, the arm 202 may grasp the second end 222 of the second strap portion 218 and pull it over the sandwich 12 producing a fully wrapped sandwich 12.

While various embodiments have been described, it will be apparent to those of ordinary skill in the art that many more embodiments and implementations are possible that are within the scope of the claims. The various dimensions described above are merely exemplary and may be changed as necessary. Accordingly, it will be apparent to those of ordinary skill in the art that many more embodiments and implementations are possible that are within the scope of the claims. Therefore, the embodiments described are only provided to aid in understanding the claims and do not limit the scope of the claims.

What is claimed:

1. A basket adapter for engaging a wire basket comprising:
    an elongated primary member having a first end and a second end opposite the first end with a body member extending between the first end and the second end, wherein the body member has a top surface, a bottom surface opposite the top surface, a front surface extending between the top surface and the bottom surface, and a rear surface opposite the front surface, and wherein the body member includes a recess along the top surface of a central portion of the basket adapter;
    a protrusion extending from the recess, wherein the protrusion extends at an acute angle to the top surface of the body member and also extends rearward of the rear surface; and
    wherein the body member includes a first groove in the top surface spaced inward from the first end and a second groove in the top surface spaced inward from the second end, wherein the first groove and the second groove are both configured to engage side handles of the wire basket, and wherein the first groove and the second groove both extend from the front surface to the rear surface of the body member.

2. The basket adapter of claim 1, wherein the body member has a substantially rectangular cross-section.

3. The basket adapter of claim 1, wherein the protrusion has a substantially square cross-sectional shape.

4. The basket adapter of claim 1, wherein the first groove has a planar bottom surface.

5. The basket adapter of claim 4, wherein the first groove and the second groove are configured to slidably engage side handles of the wire basket.

6. The basket adapter of claim 1, wherein the first groove and the second groove are configured to releasably engage the side handles of the wire basket.

7. The basket adapter of claim 1, wherein the first groove has a width at a bottom surface of the first groove that is larger than a width at an opening at a top end of the first groove.

8. The basket adapter of claim 1, wherein the protrusion has at least two planar surfaces.

9. The basket adapter of claim 1, wherein the acute angle is between 25 degrees and 55 degrees.

10. The basket adapter of claim 1, wherein the protrusion is pivotally connected to the elongated primary member.

11. A basket adapter for engaging a wire basket comprising:
    an elongated primary member having a first end and a second end opposite the first end with a body member extending between the first end and the second end, wherein the body member has a top surface, a bottom surface opposite the top surface, a front surface extending between the top surface and the bottom surface, and a rear surface opposite the front surface,
    wherein the body member has a first end region adjacent the first end, a second end region adjacent the second end, and a central portion positioned between the first end region and the second end region, wherein the first end region and the second end region have a first thickness that is greater than a second thickness of the central portion of the body member;
    a protrusion extending from the central portion of the body member, wherein the protrusion extends at an acute angle to the top surface of the body member and also extends rearward of the rear surface, wherein the protrusion has at least two planar surfaces and a substantially square cross-sectional shape; and
    wherein the body member includes a first groove in the top surface of the first end region, wherein the first groove is spaced inward from the first end, and a second groove in the top surface of the second end region, wherein the second groove is spaced inward from the second end, and wherein the first groove and the second groove are both configured to releasably engage side handles of the wire basket using a snap fit connection.

12. The basket adapter of claim 11, wherein the body member has a substantially rectangular cross-section.

13. The basket adapter of claim 11, wherein the body member has a cross-sectional height within a range of 0.5 inches and 1.5 inches.

14. The basket adapter of claim 11, wherein the first groove has a planar bottom surface.

15. The basket adapter of claim 11, wherein the first groove has a curved bottom surface.

16. The basket adapter of claim 11, wherein the at least two planar surfaces are arranged opposite of each other.

17. The basket adapter of claim 11, wherein the first groove has a width at a bottom surface of the first groove that is larger than a width at an opening at a top end of the first groove.

18. The basket adapter of claim 11, wherein the first groove and the second groove are configured to slidably engage side handles of the wire basket.

19. The basket adapter of claim 11, wherein the protrusion is pivotally connected to the elongated primary member.

20. A system for holding a food product comprising:
    a wire basket configured to hold the food product, wherein the wire basket includes a wire mesh portion and a pair of wire basket handles arranged on opposite sides of the wire basket, wherein the wire basket handles are spaced above the wire mesh portion,
    a basket adapter engaged with the wire basket, the basket adapter including:
        an elongated primary member having a first end and a second end opposite the first end with a body member extending between the first end and the second end, wherein the body member has a top surface, a bottom surface opposite the top surface, a front surface extending between the top surface and the bottom surface, and a rear surface opposite the front surface;
        a protrusion extending from the body member, wherein the protrusion extends at an acute angle to the top surface of the body member and also extends rearward of the rear surface; and
        wherein the elongated primary member extends along a length of the wire basket and extends underneath the wire basket handles.

21. The system for holding a food product of claim 20, wherein the body member includes a first groove in the top surface spaced inward from the first end and a second groove in the top surface spaced inward from the second end,
    wherein the first groove and the second groove receive the wire basket handles of the wire basket, and wherein the first groove and the second groove both extend from the front surface to the rear surface of the body member.

* * * * *